(12) United States Patent
Shimoyoshi et al.

(10) Patent No.: US 6,356,211 B1
(45) Date of Patent: Mar. 12, 2002

(54) ENCODING METHOD AND APPARATUS AND RECORDING MEDIUM

(75) Inventors: Osamu Shimoyoshi; Kyoya Tsutsui, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/074,113

(22) Filed: May 7, 1998

(30) Foreign Application Priority Data

May 13, 1997 (JP) ............................................ 9-122449

(51) Int. Cl.[7] ................................................ H03M 7/00
(52) U.S. Cl. ........................................ 341/50; 704/500
(58) Field of Search ............................. 341/50, 63, 67; 704/500

(56) References Cited

U.S. PATENT DOCUMENTS

| | | | | |
|---|---|---|---|---|
| 4,706,265 A | * | 11/1987 | Furukawa | ................... 375/122 |
| 5,414,423 A | * | 5/1995 | Pennebaker | ................. 341/107 |
| 5,635,930 A | * | 6/1997 | Oikawa | ....................... 341/50 |
| 5,636,324 A | * | 6/1997 | Teh et al. | ................... 315/2.35 |
| 5,717,670 A | * | 2/1998 | Mitsuno | ....................... 369/48 |
| 6,016,295 A | * | 1/2000 | Endoh et al. | ................. 369/49 |

\* cited by examiner

*Primary Examiner*—Peguy JeanPierre
(74) *Attorney, Agent, or Firm*—Sonneschein, Nath & Rosenthal

(57) ABSTRACT

An information recording apparatus which, while enabling reproduction by an old standard accommodating reproducing device, reduces the effect of the quantization error produced on decoding at the time of encoding and decoding which realizes a multiple channel system by new standard expansion. The apparatus includes an adaptive channel conversion circuit for multiplying signals of a L or R channel with a first coefficient, multiplying signals of the other channel with a second coefficient, mixing signals of the channel multiplied with the first coefficient with signals of the channel multiplied with the second coefficient for each of the L and R channels, and for generating (L+R)/2 and (L−R)/2 from the L and R channels existing after the channel mixing. The apparatus also includes a first encoding circuit for encoding (L+R)/2 with A-codec and a second encoding circuit for encoding (L−R)/2 signal with B-codec.

44 Claims, 22 Drawing Sheets

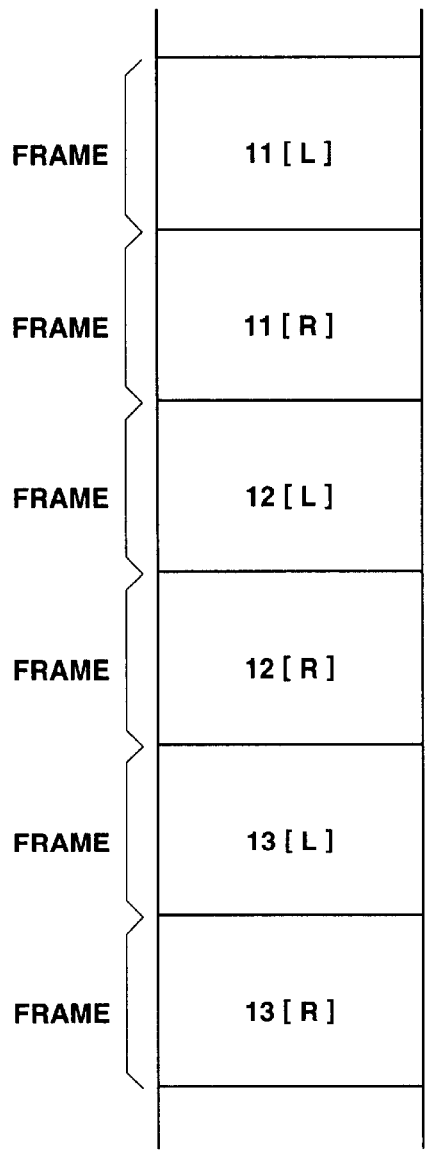
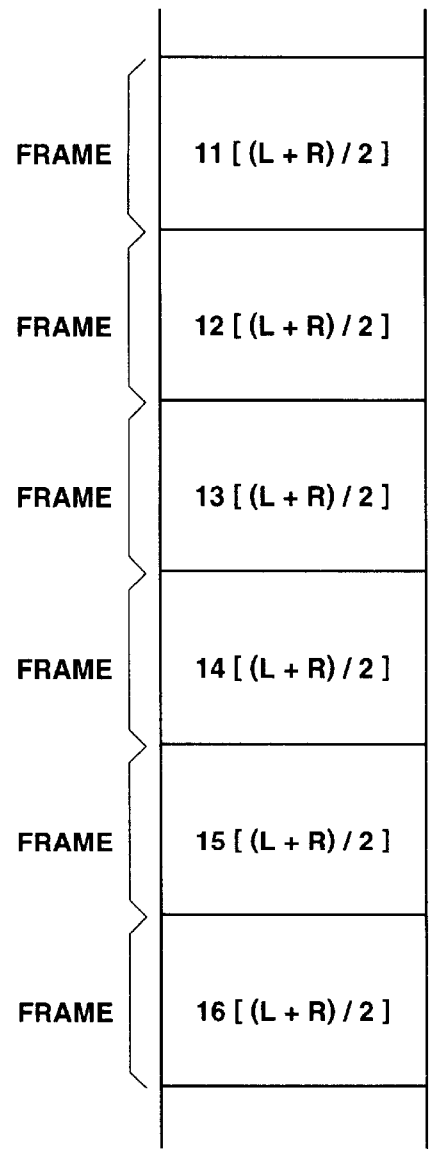
FIG.12  FIG.13

ENCODING METHOD AND APPARATUS AND RECORDING MEDIUM

BACKGROUND OF THE INVENTION

1. Field of the Invention

This invention relates to an encoding method and apparatus, suitable for encoding input signals by high efficiency encoding and for reproducing playback signals on transmission, recording, reproduction and decoding, and a recording medium.

2. Description of the Related Art

There has so far been proposed an information recording medium capable of recording signals such as the encoded acoustic information or the music information (referred to hereinafter as audio signals), such as a magneto-optical disc. Among methods for high-efficiency encoding of the audio signals, there are a so-called transform coding which is a blocking frequency spectrum splitting method of transforming a time-domain signal into frequency domain signals by orthogonal transform and encoding the spectral components from one frequency band to another, and a sub-band encoding (SBC) method, which is a non-blocking frequency spectrum splitting method of splitting the time-domain audio signals into plural frequency bands without blocking and encoding the resulting signals of the frequency bands. There is also known a high-efficiency encoding technique which is a combination of the sub-band coding and transform coding, in which case the time domain signals are split into plural frequency bands by SBC and the resulting band signals are orthogonal transformed into spectral components which are encoded from band to band.

Among the above-mentioned filters is a so-called QMF (Quadrature Mirror Filter) as discussed in R.E. Crochiere, Digital Coding of Speech in subbands, Bell Syst. Tech. J. Vol.55, No.8, 1976. This QMF filter splits the frequency spectrum into two bands of equal bandwidths and is characterized in that so-called aliasing is not produced on subsequently synthesizing the split bands. The technique of dividing the frequency spectrum is discussed in Joseph H. Rothweiler, Polyphase Quadrature Filters- A New Subband Coding Technique, ICASSP 83 BOSTON. This polyphase quadrature filter is characterized in that the signal can be split at a time into plural bands of equal band-width.

Among the above-mentioned techniques for orthogonal transform is such a technique in which an input audio signal is blocked every pre-set unit time, such as every frame, and discrete fourier transform (DFT), discrete cosine transform (DCT) or modified DCT (MDCT) is applied to each block for converting the signals from the time axis to the frequency axis. Discussions of the MDCT are found in J. P. Princen and A. B. Bradley, Subband/Transform coding Using Filter Bank Based on Time Domain Aliasing Cancellation, ICASSP 1987.

If the above-mentioned DFT or DCT is used as a method for transforming waveform signals into spectral signals, and transform is applied based on a time block composed of M samples, M independent real-number data are obtained. It is noted that, for reducing junction distortions between time blocks, a given time bock is usually overlapped with MI samples with both neighboring blocks, and M real-number data on an average are quantized and encoded in DFT or DCT for (M–M1) samples. It is these M real-number data that are subsequently quantized and encoded.

On the other hand, if the above-mentioned MDCT is used as a method for orthogonal transform, M independent real-number data are obtained from 2M samples overlapped with M samples of both neighboring time blocks. Thus, in MDCT, M real-number data on an average are obtained for M samples and subsequently quantized and encoded. A decoding device adds waveform elements obtained on inverse transform in each block from the codes obtained by MDCT with interference for re-constructing the waveform signals.

In general, if a time block for transform is lengthened, the spectrum frequency resolution is improved such that the signal energy is concentrated in specified frequency components. Therefore, by using MDCT in which, by overlapping with one half of each of both neighboring blocks, transform is carried out with long block lengths, and in which the number of the resulting spectral signals is not increased beyond the number of the original time samples, encoding can be carried out with higher efficiency than if DFT or DCT is used. Moreover, since the neighboring blocks have sufficiently long overlap with each other, the inter-block distortion of the waveform signals can be reduced. However, if the transform block length for transform is lengthened, more work area is required for transform, thus obstructing reduction in size of reproducing means. In particular, use of a long transform block at a time point when it is difficult to raise the integration degree of a semiconductor should be avoided since this increases the manufacturing cost.

By quantizing signals split into plural frequency bands by a filter or orthogonal transform, the frequency band in which occurs the quantization noise can be controlled so that encoding can be achieved with psychoacoustic higher efficiency by using acoustic characteristics such as masking effects. If the signal components are normalized with the maximum values of the absolute values of the signal components in the respective bands, encoding can be achieved with still higher efficiency.

As frequency band widths in case of quantizing the frequency components, obtained on splitting the frequency spectrum, it is known to split the frequency spectrum such as to take account of the psychoacoustic characteristics of the human auditory system. Specifically, the audio signals are divided into a plurality of, such as 25, bands using bandwidths increasing with increasing frequency. These bands are known as critical bands. In encoding the band-based data, encoding is carried out by fixed or adaptive bit allocation on the band basis. In encoding coefficient data obtained by MDCT processing by bit allocation as described above, encoding is by an adaptive number of bit allocation for band-based MDCT coefficients obtained by block-based MDCT processing. As these bit allocation techniques, there are known the following two techniques.

For example, in R. Zelinsky and P. Noll, Adaptive Transform Coding of Speech Signals and in 'IEEE Transactions of Acoustics, Speech and Signal Processing, vol. ASSP-25, No.4, August 1977, bit allocation is performed on the basis of the magnitude of the band-based signals. With this system, the quantization noise spectrum becomes flat, such that the quantization noise is minimized. However, the actual noise feeling is not psychoacoustically optimum because the psychoacoustic masking effect is not exploited.

In a publication 'ICASSP 1980, The critical band coder—digital encoding of the perceptual requirements of the auditory system, M. A. Krasner, MIT', the psychoacoustic masking mechanism is used to determine a fixed bit allocation that produces the necessary signal-to-noise ratio for each critical band. However, if this technique is used to measure characteristics of a sine wave input, non-optimum results are obtained because of the fixed allocation of bits among the critical bands.

For overcoming these problems, there is proposed a high-efficiency encoding device in which a portion of the total number of bits usable for bit allocation is used for a fixed bit allocation pattern pre-fixed from one small block to another and the remaining portion is used for bit allocation dependent on the signal amplitudes of the respective blocks, and in which the bit number division ratio between the fixed bit allocation and the bit allocation dependent on the signal amplitudes is made dependent on a signal related to an input signal, such that the bit number division ratio to the fixed bit allocation becomes larger the smoother the signal spectrum.

This technique significantly improves the signal-to-noise ratio on the whole by allocating more bits to a block including a particular signal spectrum exhibiting concentrated signal energy. By using the above techniques, for improving the signal-to-noise ratio characteristics, not only the measured values are increased, but also the sound as perceived by the listener is improved in signal quality, because the human auditory system is sensitive to signals having acute spectral components.

A variety of different bit allocation techniques have been proposed, and a model simulating the human auditory mechanism has also become more elaborate, such that perceptually higher encoding efficiency can be achieved supposing that the encoding device capability is correspondingly improved.

In these techniques, the customary practice is to find real-number reference values for bit allocation, realizing the signal-to-noise characteristics as found by calculations as faithfully as possible, and to use integer values approximating the reference values as allocated bit numbers.

For constructing a real codestring, it suffices if the quantization fineness information and the normalization coefficient information are encoded with pre-set numbers of bits, from one normalization/quantization band to another, and the normalized and quantized spectral signal components are encoded. In the ISO standard (ISO/IEC 11172–3:1993 (E), 1993), there is described a high-efficiency encoding system in which the numbers of bits representing the quantization fineness information are set so as to be different from one band to another. Specifically, the number of bits representing the quantization fineness information is set so as to be decreased with the increased frequency.

There is also known a method of determining the quantization fineness information in the decoding device from, for example, the normalization coefficient information. Since the relation between the normalization coefficient information and the quantization fineness information is set at the time of setting the standard, it becomes impossible to introduce the quantization fineness control based on a more advanced psychoacoustic model in future. In addition, if there is a width in the compression ratio to be realized, it becomes necessary to set the relation between the normalization coefficient information and the quantization fineness information from one compression ratio to another.

The above-described encoding techniques can be applied to respective channels of acoustic signals constructed by plural channels. For example, the encoding techniques can be applied to each of the left channel associated with a left-side speaker and the right channel associated with a right-side speaker. The encoding techniques can also be applied to the (L+R)/2 signal obtained on summing the L-channel and R-channel signals together. The above-mentioned techniques may also be applied to (L+R)/2 and (L−R)/2 signals for realizing efficient encoding. Meanwhile, the amount of data for encoding one-channel signals equal to one-half the data volume required for independently encoding the two-channel signals suffices. Thus, such a method of recording signals on a recording medium is frequently used in which a mode for recording as one-channel monaural signals and a mode for recording as two-channel stereo signals are readied and recording can be made as monaural signals if it is required to make long-time recording.

There is also known a method of using variable length codes for encoding for realization of more efficient encoding of quantized spectral signal components, as described in D. A. Huffman, "A Method for Construction of Minimum Redundancy Codes", in Proc. I.R.E., 40, p. 1098 (1952).

In International Publication WO94/28633 of the present Assignee, there is disclosed a method of separating perceptually critical tonal components, that is signal components having the signal energy concentrated in the vicinity of a specified frequency, from the spectral signals, and encoding the signal components separately from the remaining spectral components. This enables audio signals to be efficiently encoded with a high compression ration without substantially deteriorating the psychoacoustic sound quality.

Meanwhile, the techniques of improving the encoding efficiency are currently developed and introduced one after another, such that, if a standard including a newly developed proper encoding technique is used, it becomes possible to make longer recording or to effect recording of audio signals of higher sound quality for the same recording time.

In setting the above-described standard, an allowance is left for recording the flag information concerning the standard on the information recording medium in consideration that the standard may be modified or expanded in future. For example, '0' or '1' are recorded as a 1-bit flag information when initially setting or modifying the standard, respectively. The reproducing device complying with the as-modified standard checks if the flag information is '0' or '1' and, if this flag information is '1', the signal is read out and reproduced from the information recording medium in accordance with the as-modified standard. If the flag information is '0', and the reproducing device is also in meeting with the initially set standard, the signal is read out and reproduced from the information recording medium on the basis of the standard. If the reproducing device is not in meeting with the initially set standard, the signal is not reproduced.

The present Assignee has proposed in Japanese Patent Application No. H-9-42514 an encoding method for encoding multi-channel signals in terms of a frame the size of which cannot be controlled by an encoder. In this technique, signals of a channel to be encoded in accordance with a standard once set (referred to hereinafter as an "old standard") are encoded with a number of bits smaller than the maximum number of bits that can be allocated for a given frame and encoded signals of other channels are arranged in a vacant area in the frame so generated to enable reproduction of signals of a minor number of channels with a reproducing reproducing device associated with the old standard (referred to hereinafter as an old standard accommodating reproducing device), while signals of a larger number of channels can be reproduced by employing a reproducing device (referred to hereinafter as a new standard accommodating reproducing device) associated with the new standard (referred to hereinafter as new standard).

By this method, the encoding method for signals of channels not reproduced by the old standard accommodating reproducing device is made higher in the encoding efficiency than the old standard encoding method to reduce deterioration in sound quality otherwise caused by encoding multi-channel signals. By recording A=(L+R)/2 signal in an area reproducible by the old standard accommodating reproducing device and B=(L−R)/2 signals in an area not reproducible by the old standard accommodating reproducing device, in accordance with this method, the old standard accommodating reproducing device can reproduce monaural signals, while the new standard accommodating reproducing device can reproduce stereo signals L and R from channels A and B.

The method for encoding (L+R)/2 and (L−R)/2 signals and reproducing the encoded stereo signals is described in, for example, James D. Johnston, "Perceptual Transform Coding of Wideband Stereo Signals", ICASSP89, pp. 1993–1995).

The present Assignee has also proposed in Japanese Patent Application No.H-9-92448 a technique in which signals of an area not reproduced by the old standard accommodating reproducing device are selected from (L−R)/2, L and R for reducing the effect of the quantization error which presents itself when encoding the signals having a significant level difference between left and right channels.

Meanwhile, if it is desired to attempt standard expansion using a signal decoding method which enables a larger number of channel signals to be reproduced by standard expansion while enabling a smaller number of channels to be reproduced by the old standard accommodating reproducing device for standard expansion for reproducing stereo signals, there are occasions wherein the quantization noise produced on encoding presents problems depending on the sorts of stereo signals.

Referring to FIGS. 1 and 2, the manner of generation of the quantization noise is explained.

FIGS. 1A and 1B show frequency spectral components of left channel (L) and right channel (R) components of typical stereo signals.

FIGS. 1C and 1D illustrate frequency spectrum waveforms of signals obtained on converting the L and R signals into signals corresponding to (L+R)/2 and (L−R)/2 by channel conversion. Since in general the respective channels of stereo signals exhibit strong correlation, the channel of B=(L−R)/2 is significantly smaller in signal component level than L or R channel.

FIGS. 1E and 1F show the state of the quantization noise generated on encoding and subsequently decoding signals of A and B channels by the high efficiency encoding method. N1 and N2 denote the frequency components of the quantization noise generated on encoding the A and B channels. The signal obtained on encoding and decoding the channel A and that obtained on encoding and decoding the channel B are termed (A+Ni) and (B+N2), respectively. In the high efficiency encoding method, it is a frequent occurrence that the quantization noise level depends on the level of the original signal component. In such case, the level of the quantization noise N2 is significantly lower than the quantization noise N2.

FIGS. 1G and 1H denote the manner in which the respective channels of the stereo signals have been separated from the (A+N1) and (B+N2) signal components. By adding (A+N1) to (B+N2), the R component is canceled, while only the L-component can be retrieved. Similarly, by subtracting (B+N2) from (A+N1), the L-component is canceled, while only the R component can be retrieved.

The quantization noises N1 and N2 are left as (N1+N2) or (N1−N2). Since N2 is significantly low in level as compared to N1, neither (N1+N2) nor (N1−N2) raises psychoacoustic problems.

FIG. 2 shows the state of the quantization noise produced on encoding, decoding and reproducing stereo signals having no correlation between left and right channels.

FIGS. 2A and 2B show the frequency spectral waveforms of left channel (L) components and right channel (R) components having no correlation between left and right channels.

FIGS. 2C and 2D show the spectral signal waveforms of signals obtained on channel-converting the L and R signals into signals equivalent to (L+R)/2 and (L−R)/2 signals. As in the example of FIG. 1, (L+R)/2 and (L−R)/2 channels are termed A and B channels, respectively. Since L and R exhibit no correlation, the signal B=(L−R)/2 is not lowered in signal level.

FIGS. 2E and 2F show the state of the quantization noise produced on encoding the signals of the channels A and B by the above-described high efficiency encoding method and decoding the encoded signals. N1 and N2 denote tine-axis waveforms of the quantization noise components produced in encoding the signals of the A and B channels, respectively. As in the example of FIG. 1, signals obtained on encoding and decoding the A and B channels are termed (A+N1) and (B+2), respectively.

FIGS. 2G and 2H show the state in which respective channels of the stereo signals are separated from the signal waveforms (A+N1) and (B+N2). Addition of (A+N1) and (B+N2) cancels out the L component to make it possible to retrieve only the R component.

However, since the high-range side components of (N1+N2) and low-range side components of (N1−N2) are not masked by the original signals, these quantization noises give negative psychoacoustic effects.

In the stereo signals, since the signal levels or energies of both channels are substantially unchanged, it is similarly difficult to select a channel for encoding such as to minimize the quantization noise depending on the signal level or energy.

SUMMARY OF THE INVENTION

It is an object of the present invention to provide an encoding method and apparatus which makes it possible to reduce the effect of the quantization noise otherwise produced after decoding on the occasion of encoding and decoding which realizes multiple channels by new standard expansion while enabling reproduction by the old standard accommodating reproducing device.

In one aspect, the present invention provides an encoding method including computing mixing coefficients of a plurality of channel signals, mixing the channel signals based on the mixing coefficients, generating plural processing signals corresponding to the channel signals from the mixed channel signals and encoding the processing signals.

In another aspect, the present invention provides an encoding method including computing mixing coefficients of a plurality of channel signals, generating plural processing signals corresponding to the channel signals from the channel signals, multiplying the processing signals with coefficients derived from the mixing coefficients and encoding the processing signals multiplied with the coefficients.

In a further aspect, the present invention provides an encoding apparatus including means for computing mixing coefficients of a plurality of channel signals, means for mixing the channel signals based on the mixing coefficients, means for generating plural processing signals corresponding to the channel signals from the mixed channel signals and means encoding the processing signals.

In a further aspect, the present invention provides an encoding apparatus including means for computing mixing coefficients of a plurality of channel signals, means for generating plural processing signals corresponding to the channel signals from the channel signals, means for multiplying the processing signals with coefficients derived from the mixing coefficients and means for encoding the processing signals multiplied with the coefficients.

In a further aspect, the present invention provides a recording medium having recorded thereon encoded signals, wherein the recorded signals include codestrings generated on computing mixing coefficients of a plurality of channel signals, mixing the channel signals based on the mixing coefficients, generating plural processing signals corresponding to the channel signals from the mixed channel signals and on encoding the processing signals.

In yet another aspect, the present invention provides a recording medium having recorded thereon encoded signals, wherein the recorded signals include codestrings generated on computing mixing coefficients of a plurality of channel signals, generating plural processing signals corresponding to the channel signals from the channel signals, multiplying the processing signals with coefficients derived from the mixing coefficients and encoding the processing signals multiplied with the coefficients.

Thus, the present invention provides an information recording apparatus which, while enabling reproduction by an old standard accommodating reproducing device, reduces the effect of the quantization error produced on decoding at the time of encoding and decoding which realizes multiple channels by new standard expansion, by mixing input signals constituted by plural channels in the mixing ratio as set depending on the inter-channel correlation.

That is, in the method for enabling multi-channel reproduction for prolonged time with a new standard accommodating recording device, while enabling reproduction by an old standard accommodating reproducing device, the present invention enables signal reproduction in a manner such that the effect of lowering of the sound quality by using multiple channels can be suppressed to minimum.

BRIEF DESCRIPTION OF THE DRAWINGS

FIG. 12 shows an example of arraying L and R channels from frame to frame.

FIG. 13 shows an example of arraying a (L+R)/2 channel to a frame.

DESCRIPTION OF PREFERRED EMBODIMENTS

Figure 1A:
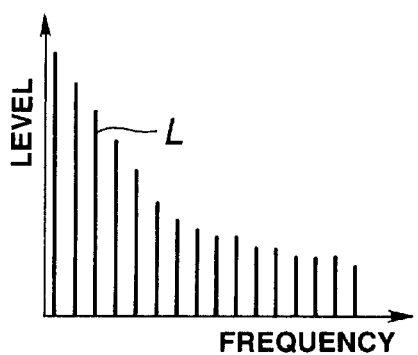
FIGS. 1A to 1H illustrate the status of the quantization noise produced on encoding depending on the types of the stereo signals when reproducing stereo signals on standard expansion.
Figure 1B:
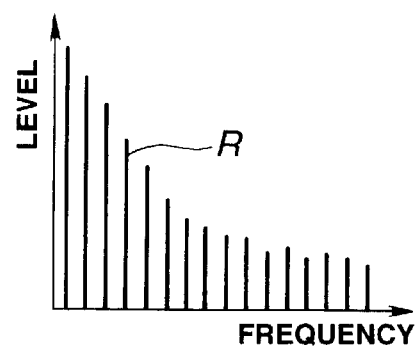
Figure 1C:
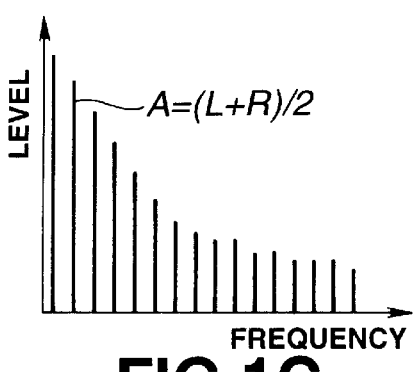
Figure 1D:
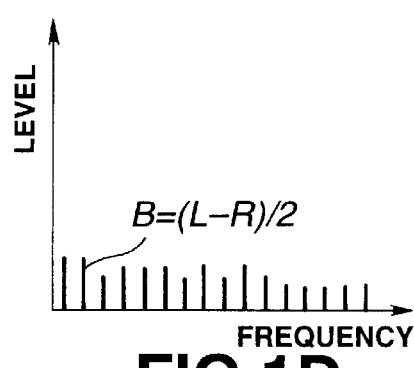
Figure 1E:
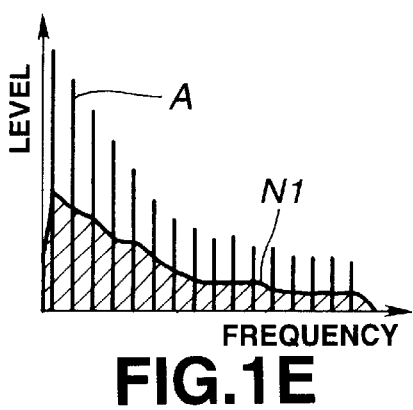
Figure 1F:
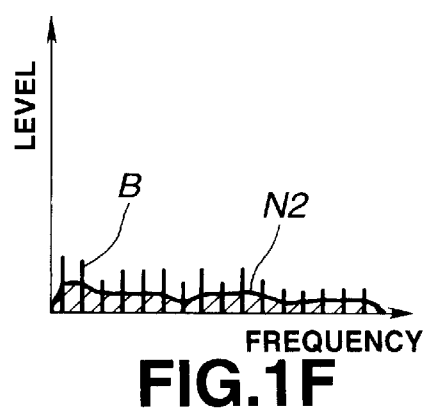
Figure 1G:
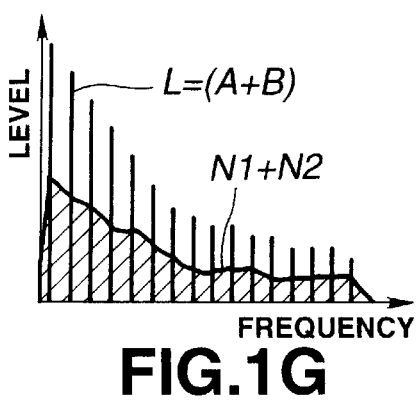
Figure 1H:
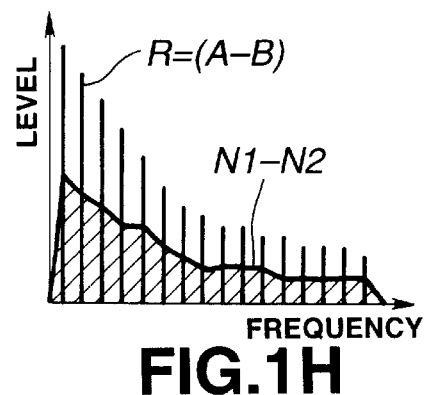

Referring to the drawings, preferred embodiments of the present invention will be explained in detail.

Figure 3:
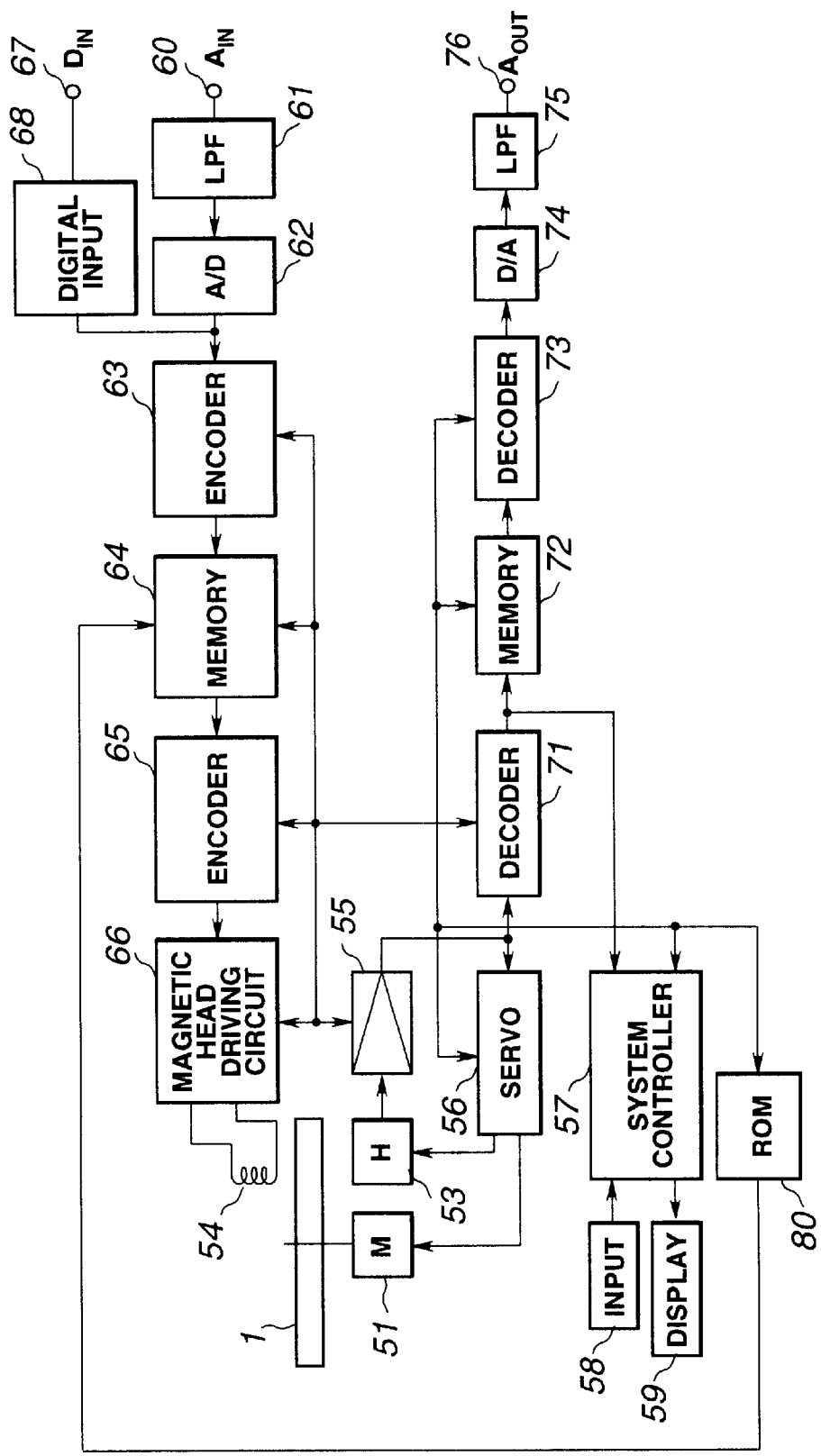
FIG. 3 is a block circuit diagram showing an illustrative structure of a recording/reproducing apparatus as an embodiment of a recording/reproducing apparatus of compressed data according to the present invention.

FIG. 3 shows a schematic structure of a compressed data recording and/or reproducing apparatus embodying the present invention.

In the compressed data recording and/or reproducing apparatus shown in FIG. 3, a magneto-optical disc 1, run in rotation by a spindle motor (M) 51, is used as a recording medium. For recording data on the magneto-optical disc 1, a modulated magnetic field corresponding to recording data is applied to a magnetic head 54, whilst the laser light beam is illuminated by an optical head (H) 53, by way of performing so-called magnetic field modulation recording, for recording data along the recording track of the magneto-optical disc 1. For reproduction, the recording track of the magneto-optical disc 1 is traced with the laser light beam by the optical head 53 for photomagnetic reproduction.

The optical head 53 is made up of a laser light source, such as a laser diode, optical components, such as collimator lens, objective lens, polarising beam splitter or a cylindrical lens, and a photodetector having light receiving sections of a pre-set pattern. This optical head 53 is provided facing the magnetic head 54 via the magneto-optical disc 1 in-between. For recording data on the magneto-optical disc 1, the magnetic head 54 is driven by a magnetic head driving circuit 66 of the recording system as later explained for impressing the modulated magnetic field in meeting with the recording data, at the same time as the laser light is illuminated on a target track on the magneto-optical disc 1, by way of effecting thermo-magnetic recording in accordance with the magnetic field modulating system. The optical head 53 also detects the focusing error by, for example, the astigmatic method, while detecting the tracking error by the push-pull method. When reproducing data from the magneto-optical disc 1, the optical head 53 detects the focusing error and the tracking error, at the same time as it detects the difference in the polarization angle (Ker rotation angle) from the target track of the laser light for generating playback signals.

An output of the optical head 53 is sent to an RF circuit 55, which extracts the focusing error and tracking error signals from the output of the optical head 53 to supply the extracted signals to a servo control circuit 56, while converting the reproduced signals into bi-level signals which are sent to a decoder 71 of the reproducing system.

The servo control circuit 56 is made up of, for example, a focusing servo control circuit a spindle motor servo control circuit and a thread servo control circuit. The focusing servo control circuit tracking-controls the optical system of the optical head 53 so that the focusing error signals will be reduced to zero. The tracking servo control circuit tracking-controls the optical system of the optical head 53 so that the tracking error signals will be reduced to zero. The spindle motor servo control circuit controls the spindle motor 51 so that the magneto-optical disc 1 will be run in rotation at a pre-set rotational velocity, such as at a constant linear velocity. The thread servo control circuit shifts the optical head 53 and the magnetic head 54 to the target track position of the, magneto-optical disc 1 specified by the system controller 57. The servo control circuit 56, performing these various control operations, sends the information specifying the operating states of the various components, controlled by the servo control circuit 56, to the system controller 57.

In the system controller 57 are housed a key input actuating unit 58 and a display 59. This system controller 57 controls the recording system and the reproducing system by the actuating input information by the key input actuating unit 58. The system controller 57 also supervises the recording position and the reproducing position on the recording track being traced by the optical head 53 and the magnetic head 54 based on the sector-based address information reproduced by the header time or sub-code Q-data from the recording track of the magneto-optical disc 1. The system controller 57 also manages control for displaying the playback time on the display 59 based on the data compression ratio of the recording and/or reproducing apparatus and the playback position information of the recording track.

For displaying the playback time, the sector-based address information reproduced from the recording track of the magneto-optical disc 1 by the so-called header time or the so-called sub-code Q-data (absolute time information) is multiplied by a reciprocal of the data compression ratio, such as 4 for the ¼ compression, to find the actual time information, which is displayed on the display 59. It is noted that, for recording, if the absolute time information is pre-recorded on, for example, the recording track of the magneto-optical disc 1, by way of re-formatting, this pre-formatted absolute time information may be read out and multiplied by the reciprocal of the data compression ratio to display the current position in terms of the actual recording time.

Then, in the recording system of the disc recording/reproducing apparatus, analog audio input signal $A_{in}$ from an input terminal 60 is sent via a low-pass filter LPF 61 to an A/D converter 62, which then quantizes the analog audio input signal Ain. The digital audio signal from the A/D converter 62 is sent to an adaptive transform coding (ATC) encoder 63. On the other hand, digital audio input signal Din from an input terminal 67 is sent via a digital input interfacing circuit (digital input) 68 to the ATC encoder 63. The ATC encoder 63 processes the digital audio PCM data of the pre-set transfer rate, quantized by the A/D converter 62 from the input signal Ain, with bit compression (data compression) in meeting with the pre-set data compression rate. Output compressed data (ATC data) from the ATC encoder 63 is sent to a memory 64. If, for example, the data compression rate is ⅛, the data transfer rate is reduced to ⅛ of the data transfer rate of 75 sectors/sec of the above-mentioned standard CD-DA format, that is to 9.3 75 sectors/sec.

The memory 64 has data writing and data readout controlled by the system controller 57 and is used as a buffer memory for transiently recording the ATC data sent from the ATC encoder 63 for storage on the disc when necessary. That is, if the data compression rate is ⅛, the compressed audio data supplied from the ATC encoder 63 has its data transfer rate reduced to ⅛ of the of the standard CD-DA format data transfer rate of 75 sectors/sec, or to 9.375 sectors/sec. This compressed data is written in succession on the memory 64. Although this compressed data (ATC data) needs only to be recorded at a rate of one out of eight sectors, as discussed above, sector-continuous recording, as later explained, is used, because recording every eight sectors is almost impossible. This recording is made in a burst fashion at the same data transfer rate of 75 sectors/sec as the standard CD-DA format data transfer rate, using a cluster made up of a pre-set plural number of sectors, such as 32 plus several sectors, with the interposition of non-recording periods.

That is, the ATC audio data with the data compression rate of ⅛, continuously written at a low transfer rate of 9.375 (+75/8) sectors/second, are read out from the memory 64 in a burst-like manner as recording data at the above-mentioned transfer rate of 75 sectors/second. The overall data transfer rate of the data, thus read out and recorded, including the non-recording period, is the above-mentioned low rate of 9.375 sectors/second. However, the instantaneous data transfer rate during the burst-like recording operation is the above-mentioned standard rate of 75 sectors/second. Therefore, if the rotational velocity of the disc is the above-mentioned standard velocity of the CD-DA format (constant linear velocity), recording is by the same recording density and with the same recording pattern as those of the CD-DA format.

The ATC audio data, that is the recording data, read out from the memory 64 in the burst-like fashion at the (instantaneous) transfer rate of 75 sectors/ second, is supplied to an encoder 65. In the data string supplied from the memory 64 to the encoder 65, a continuous recording unit per each recording is a cluster made up of plural sectors, such as 32 sectors, and several cluster-interconnecting sectors arrayed ahead and at back of the cluster. These cluster interconnecting sectors are set so as to be longer than the interleaving length at the encoder 65, such that interleaving cannot affect data of other clusters.

The encoder 65 applies encoding for error correction, such as parity appendage and interleaving, or EFM encoding, to the recording data supplied in a burst-like fashion from the memory 64. The recording data encoded by the encoder 65 are supplied to the magnetic head driving circuit 66 To this magnetic head driving circuit 66 is connected the magnetic head 54 so that the magnetic head 54 is driven for applying the magnetic field modulated in accordance with the recording data to the magneto-optical disc 1.

The system controller 57 performs memory control as described above on the memory 64, while also controlling the recording position for continuously recording the recording data continuously in a burst-like fashion from the memory 64 by this memory control on the recording track of the magneto-optical disc 1. For controlling the recording position in this manner, the recording position read out in a burst fashion from the memory 64 is supervised by the system controller 57 for supplying a control signal designating the recording position on the recording track of the magneto-optical disc 1 to the servo control circuit 56.

The reproducing system is now explained. This reproducing system is configured for reproducing recording data continuously recorded on the recording track of the magneto-optical disc 1 by the above-described recording system. Thus, the reproducing system includes a decoder 71 supplied with a bi-level signal obtained by a RF circuit 55 from the playback output obtained in turn by the optical head 53 tracing the recording track of the magneto-optical disc 1 with a laser light beam. It is noted that not only the magneto-optical disc but also the read-only optical disc similar to the compact disc (CD) can be read.

The decoder 71 is a counterpart device of the encoder 65 of the above-described recording system. The playback output, converted into the bi-level signal by the RF circuit 55, is decoded for error correction or EFM decoded for reproducing the ATC audio data having the data compression rate of ⅛ at a transfer rate of 75 sectors/ second which is faster than the normal transfer rate. The playback data, obtained by the decoder 71, is supplied to a memory 72.

In the memory 72, having data write/readout controlled by the system controller 57, the playback data supplied from the decoder 71 at the transfer rate of 75 sectors/second, is written in a burst-like fashion at the transfer rate of 75 sectors/second. In the memory 72, the above-mentioned playback data, written at the above-mentioned transfer rate of 75 sectors/second, is continuously read out at the transfer rate of 9.375 sectors/second corresponding to the data compression rate of ⅛.

The system controller 57 performs memory control for writing the playback data in the memory 72 at the transfer rate of 75 sectors/second, while reading out the playback data from the memory 7 at the transfer rate of 9.375 sectors/second. The system controller 57, performing the memory control for the memory 72 as described above, controls the playback position for continuously reading out the playback data written in the burst-like fashion from the memory 72 by the memory control from the recording track of the magneto-optical disc 1. The playback position control is by supervising the playback position of the playback data read out in the burst-like fashion from the memory 72 by the system controller 57 and by supplying a control signal designating the playback position on the recording track of the optical disc 1 or the magneto-optical disc 1 to the servo control circuit 56.

The ATC audio data, continuously read out from the memory 72 at the transfer rate of 9.375 sectors/second, is supplied to an ATC decoder 73. This ATC decoder 73 is a counterpart device of the ATC encoder 63 of the recording system and reproduces the 16-bit digital audio data by expanding the ATC data by a factor of eight. The digital audio data from the ATC decoder 73 is supplied to a D/A converter 74.

The D/A converter 74 converts the digital audio data supplied from the ATC decoder 73 into an analog signal for forming an analog audio output signal $A_{out}$. This analog audio output signal $A_{out}$, obtained from the D/A converter 74, is outputted via a low-pass filter (LPF) 75 at an output terminal 76.

The high-efficiency encoding is explained in detail. Specifically, the technique of high-efficiency encoding an input digital signal, such as an audio PCM signal, by techniques of sub-band coding (SBC), adaptive transform coding (ATC) and adaptive bit allocation is explained by referring to FIG. 4.

Figure 4:
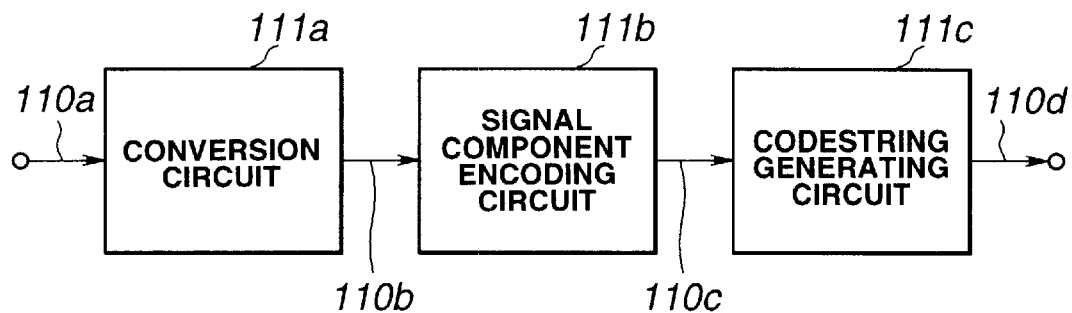
FIG. 4 is a block circuit diagram showing an illustrative structure of an encoding device according to the present invention.

In the information encoding device (encoder 63 of FIG. 3) for executing the method for encoding the information (acoustic waveform signals) of the present invention, an input signal waveform 110*a* is converted by a conversion circuit 111*a* into signal frequency components 110*b*, as shown in FIG. 4. These signal frequency components 110*b* are then encoded by a signal component encoding circuit 111*b* to produce an encoded signal 110*c*. A codestring generating circuit 111*c* then generates a codestring 110*d* from an encoded signal 110*c* generated by the codestring generating circuit 111*c*.

Figure 5:
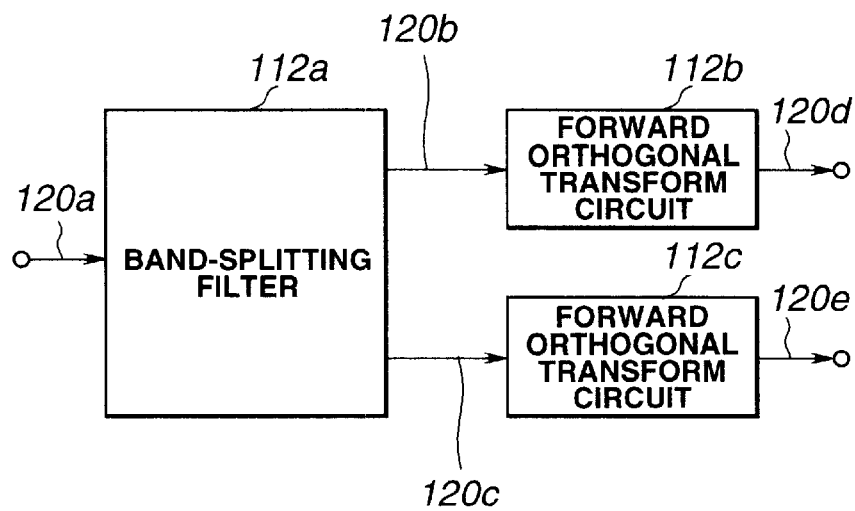
FIG. 5 is a block circuit diagram showing an illustrative structure of a signal component encoding circuit according to the present invention.

The conversion circuit 111*a* splits the input signal 120*a* by a band-splitting filter 112*a* into two bands and resulting two band signals 120*b*, 120*c* are transformed by forward orthogonal transform circuits 112*b*, 112*c* by MDCT into spectral signal components 120d, 120e, as shown in FIG. 5. The input signal 120a corresponds to the signal waveform 110a of FIG. 4, while the spectral signal components 120d, 120e correspond to the signal frequency components 110b shown in FIG. 4. In the conversion circuit 111a, shown in FIG. 5, the bandwidths of the two band-split signals 120b, 120c are one-half the bandwidth of the input signal 120a, that is, the input signal 120a is thinned out by ½. Of course, any other structure of the conversion circuit 111a may be used besides the illustrative example. For example, the input signal may be directly transformed by MDCT into spectral signals, while the input signal may also be transformed by DFT or DCT, instead of by MDCT. Although the input signal may be split into frequency components by a band splitting filter, the input signal is preferably transformed by the above-mentioned orthogonal transform methods into frequency components because then a large number of frequency components can be obtained with a smaller volume of processing operations.

Figure 6:
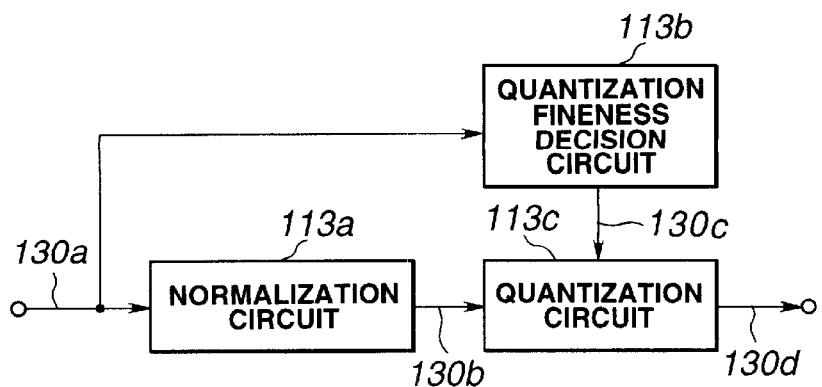
FIG. 6 is a block circuit diagram showing an illustrative structure of a conversion circuit according to the present invention.

The signal component encoding circuit 111b normalizes the signal components 130a from one pre-set band to another, by a normalization circuit 113a, while calculating the quantization fineness information 130c from the signal components 130a by the quantization fineness decision circuit 113b, as shown in FIG. 6. The quantization circuit 113c quantizes the normalized signals 130b from the normalization circuit 113a based on the quantization fineness information. Meanwhile, the signal components 130a correspond to the encoded signal 110c of FIG. 4. The output signal 130d includes the normalization coefficient information for normalization and the above-mentioned quantization fineness information, in addition to the quantized signal components.

Figure 7:
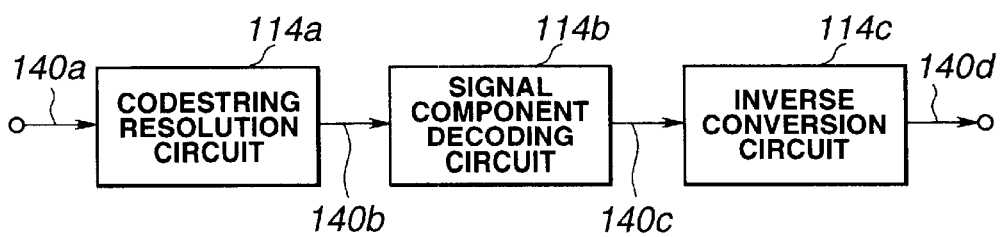
FIG. 7 is a block circuit diagram showing an illustrative structure of a decoding circuit according to the present invention.

In the information decoding apparatus (decoder 73 of FIG. 3) for regenerating the audio signals from the codestring generated by the above-described information encoder, codes 140b of the signal components are extracted from a codestring 140a by a codestring resolution circuit 114a, as shown in FIG. 7. From these codes 140b, signal components 140c are restored by a codestring decoding circuit 114b and, from the restored signal components 140c, acoustic waveform signals are regenerated by a back-conversion circuit 114c.

Figure 8:
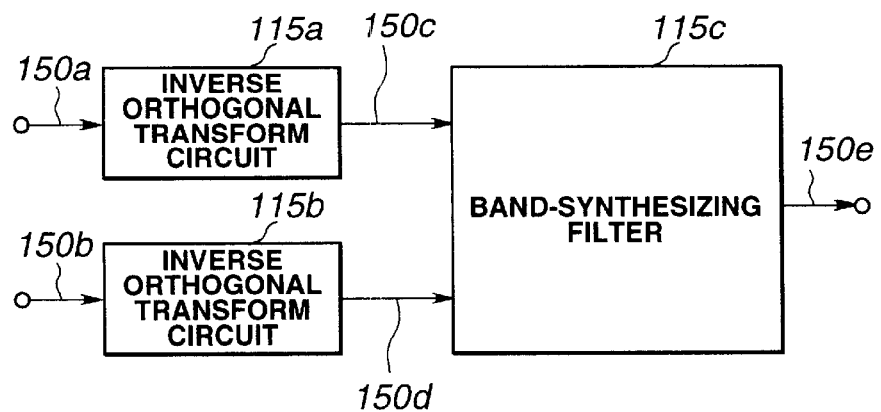
FIG. 8 is a block circuit diagram showing an illustrative structure of a back-conversion circuit according to the present invention.

This back-conversion circuit 114c of the information decoder is configured as shown in FIG. 8 and is associated with the conversion circuit shown in FIG. 5. In the back-conversion circuit 114c, shown in FIG. 8, inverse orthogonal transform circuits 115a, 115b apply inverse orthogonal transform to input signals 150a, 150b, respectively, for restoring the band signals, which are then synthesized by a band synthesizing filter 115c. The input signals 150a, 150b correspond to a signal 140c the signal components of which have been restored by the signal component decoding circuit 114b of FIG. 7. An output signal 150e of the band synthesizing filter 115c corresponds to the acoustic waveform signal 140d of FIG. 7.

Figure 9:
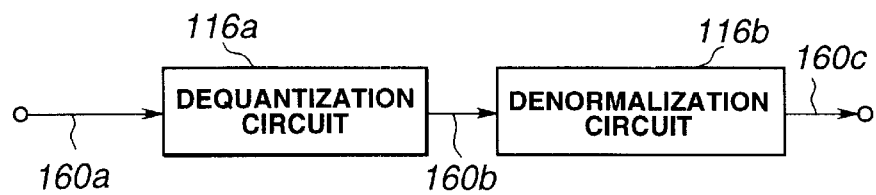
FIG. 9 is a block circuit diagram showing an illustrative structure of a signal component decoding circuit according to the present invention.

The signal component decoding circuit 114b of FIG. 7 is configured as shown in FIG. 9, and applies dequantization and denormalization processing to the codes 140b from the codestring resolution circuit 114a, that is spectral signals. In the signal component decoding circuit 114b, shown in FIG. 9, a dequantization circuit 116a dequantizes input codes 160a, while the denormalization circuit 116b denormalizes the signals 160b obtained on dequantization to output signal components 160c. The above codes 160a correspond to codes 140b from the codestring resolution circuit 114a of FIG. 7, while the output signal components 160c correspond to the signal components 140c of FIG. 7.

Figure 10:
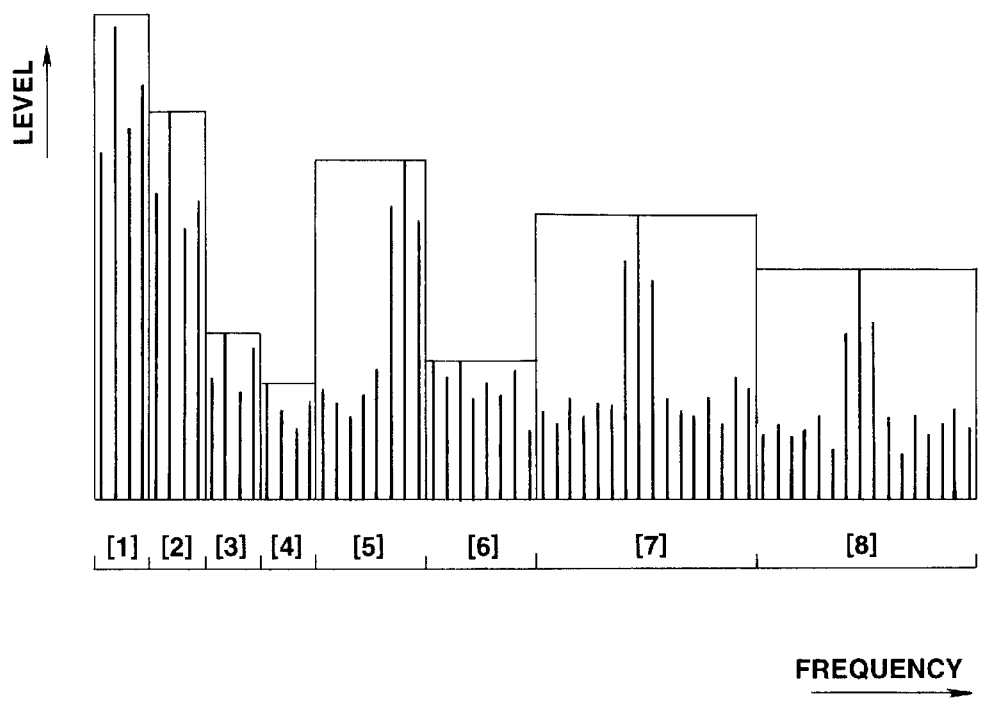
FIG. 10 illustrates a basic encoding method.

The spectral signals obtained by the conversion circuit of the above-described information encoder, shown in FIG. 5, are as shown for example in FIG. 10. The spectral components, shown in FIG. 10, denote absolute values of the spectral components by MDCT after level conversion by dB. That is, in this information encoder, the input signal is converted into 64 spectral components, from one pre-set transform block to another, and is normalized and quantized in terms of eight bands, termed herein encoding units, shown in [1] to [8] in FIG. 10. If the quantization fineness is varied from one encoding unit to another depending on how the frequency components are distributed, there is assured encoding with perceptually high efficiency with suppression of the sound quality deterioration to the minimum.

Figure 11:
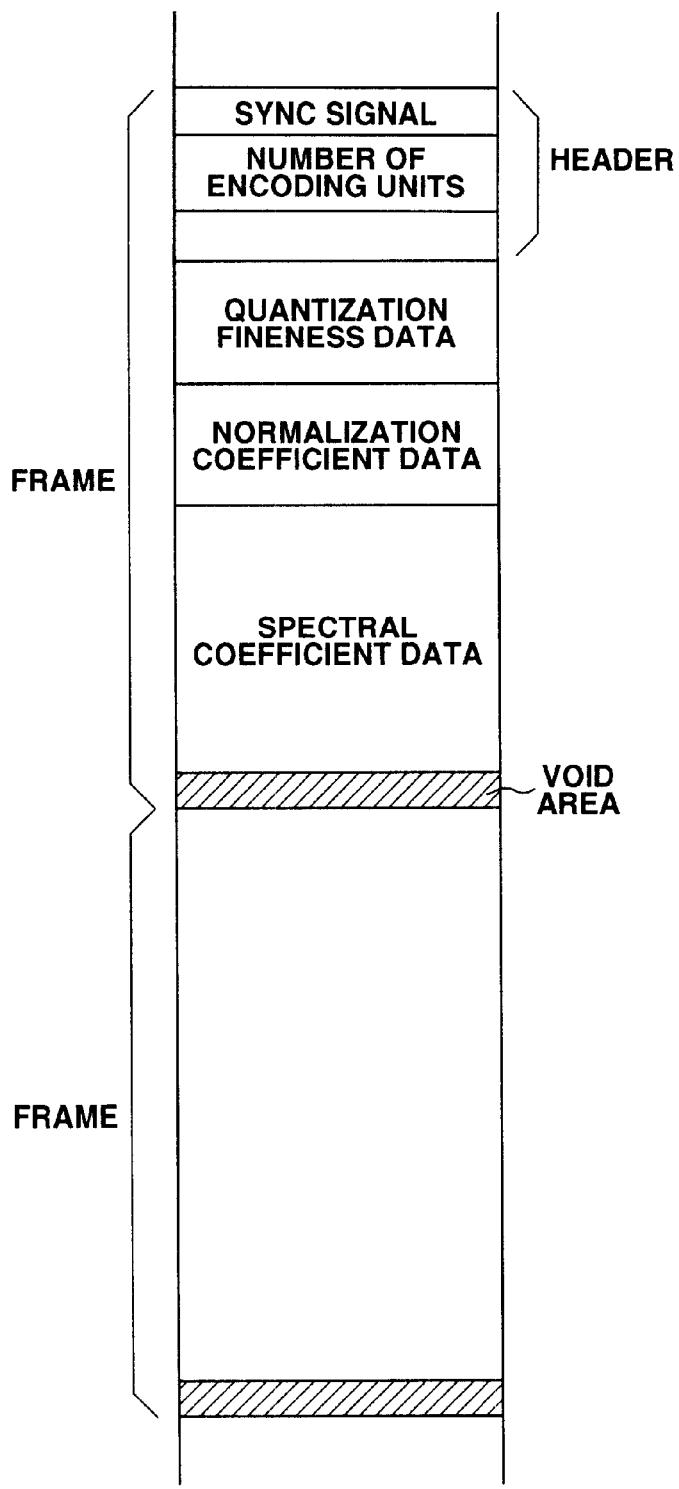
FIG. 11 illustrates the structure of a codestring of a frame encoded in accordance with the basic encoding method.

FIG. 11 shows an illustrative structure of a codestring in case of encoding as described above.

In the codestring of the present illustrative structure, there is arranged the information which is the data used for restoring the spectral signals of each transform block and which has been encoded in association with plural frames each constituted by a pre-set number of bits. At the leading end (header) of each frame is arrayed the information which is control data, such as previously encoded encoding units and the sync signals, encoded with a pre-set number of bits. The header information is followed by the information obtained on sequentially encoding the quantization fineness data and the normalization coefficient data of the encoding units in the order of the increasing frequency of the encoding units. At the trailing end of each header are spectral coefficient data normalized and quantized on the basis of the above-mentioned normalization coefficients data and the quantization fineness data from one encoding unit to another in the order of the increasing frequency of the encoding units.

The number of bits actually required for restoring the spectral signals of the transform block is set depending on the number of encoded encoding units and the number of the quantization bits specified by the quantization fineness information of each encoding unit, and may be varied from frame to frame. Only the above-mentioned required number of bits from the leading end of each frame is significant at the time of reproduction, with the remaining area of each frame being void area not influencing the playback signals. Usually, a larger number of bits are effectively used for minimizing the void area of each area.

By encoding each transform block in association with the frame of a pre-set number of bits, the recording position of an optional transform block can be calculated easily, thus enabling facilitated random accessing, that is data reproduction from an optional position.

FIGS. 12 and 13 show an example of the recording format in case of chronologically recording the frame data shown in FIG. 11 on a recording medium. FIG. 12 shows an example of alternately arranging signals of two channels, such as a left (L) channel and a right (R) channel, on the frame basis, while FIG. 13 shows an example in which one-channel signals generated by (L+R)/2 operation of left (L) and right (R) channels (monaural signals generated from the left and right channels) are arrayed on the frame basis.

By using the recording format shown in FIG. 12, the two channels of L and R can be recorded on the same recording medium. On the other hand, if the recording format of arranging only one channel of (L+R)/2 on the frame basis, as shown in FIG. 13, is used, signal recording/reproduction for double time duration becomes possible as compared to the recording format in which the two channels of L and R are arranged alternately on the frame basis as shown in FIG. 12, while the reproduction may be facilitated without complicating the reproducing circuit.

If the recording format shown in FIG. 12 is termed the standard time mode, the recording format enabling long-time recording/reproduction with a smaller number of channels can be termed a long time mode enabling recording/reproduction twice as long as the above-described standard time mode. If, in the example of FIG. 12, one of the L and R channels, instead of both the L and R channels, is recorded, the signal recording time is twice as long as the time required for recording both the L and R channels, as in FIG. 12. This recording mode can also be termed the long-time mode.

Although the foregoing description is limited to the technique of the encoding method explained with reference to FIG. 11, it is also possible to improve the encoding efficiency further with respect to the encoding method of FIG. 11.

For example, the so-called variable length coding, in which a short code length and a longer code length are allocated to quantized spectral signals of higher and lower frequency of occurrence, respectively, may be used for improving the encoding efficiency.

In addition, if the above-mentioned pre-set transform block in encoding the input signals, that is the time block length for orthogonal transform, is set to a longer value, the amount of the subsidiary information, namely the quantization fineness information or the normalization coefficient information, can be reduced relatively per block, while the frequency resolution is improved, thus enabling the quantization fineness to be controlled on the frequency axis more finely thus improving the encoding efficiency.

There is also disclosed in the International Publication WO94/28683 by the present Assignee a method of separating perceptually crucial tonal signal components from the spectral signal components for encoding independently of other spectral signal components. If this method is used, audio signals or the like can be encoded efficiently at a high compression ratio without substantially producing perceptual signal deterioration.

Figure 14:
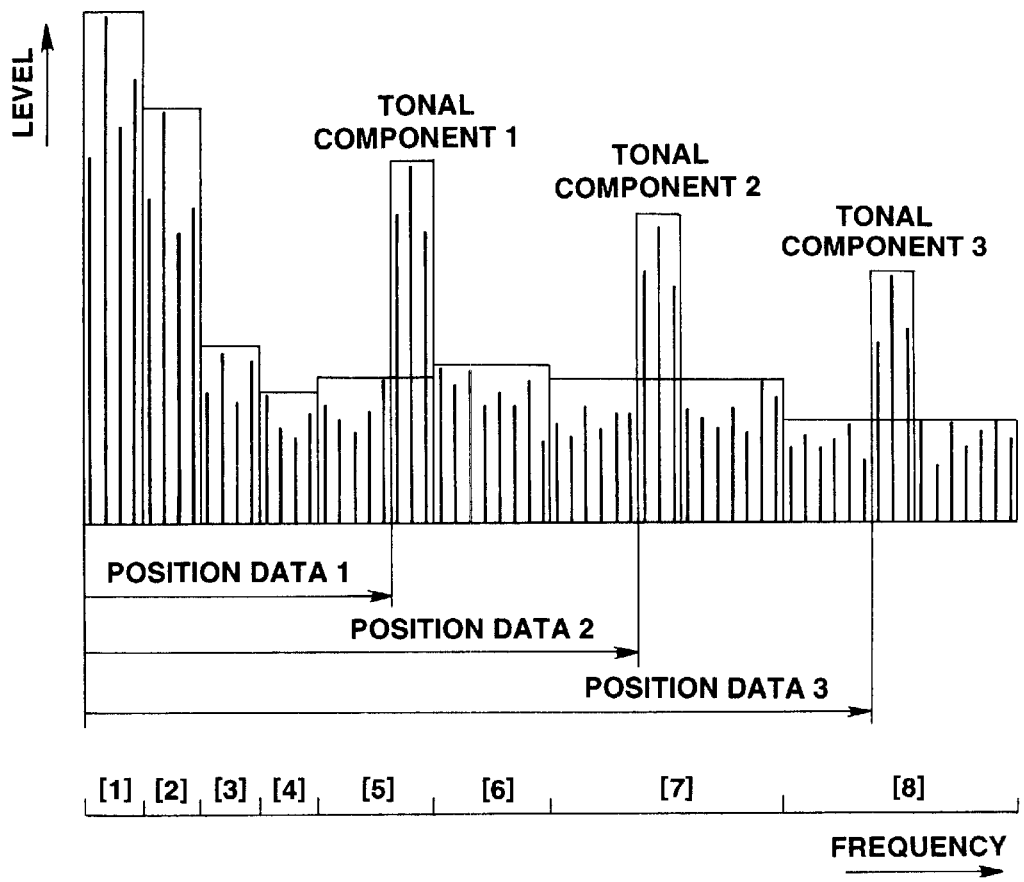
FIG. 14 illustrates an encoding method for encoding the signal components divided into tonal and non-tonal components.

The method of separating and encoding the tonal signals components is explained with reference to FIG. 14. In the example of FIG. 14, there is shown the state in which three tonal component sets, as tonal signal components, have been separated from the spectral signals components. The signal components, making up these tonal component sets, are encoded along with the respective position data of the tonal components on the frequency axis.

In general, the signal components of the tonal components, in which the signal energy is concentrated in a small number of spectral components, need to be quantized to an extremely high degree of fineness. The spectral components in each encoding unit freed of tonal components (non-tonal spectral signal components) can be quantized with a relatively small number of bits without deteriorating the perceptual sound quality.

Although only a relatively small number of spectral signal components are shown in FIG. 14 for simplifying the drawing, the signal energy is concentrated in a few signal components of tens of signal components making up a given encoding unit. Therefore, the amount of data is not increased significantly as a result of separation of the tonal components, such that the encoding efficiency can be improved on the whole by separating the tonal components.

Figure 15:
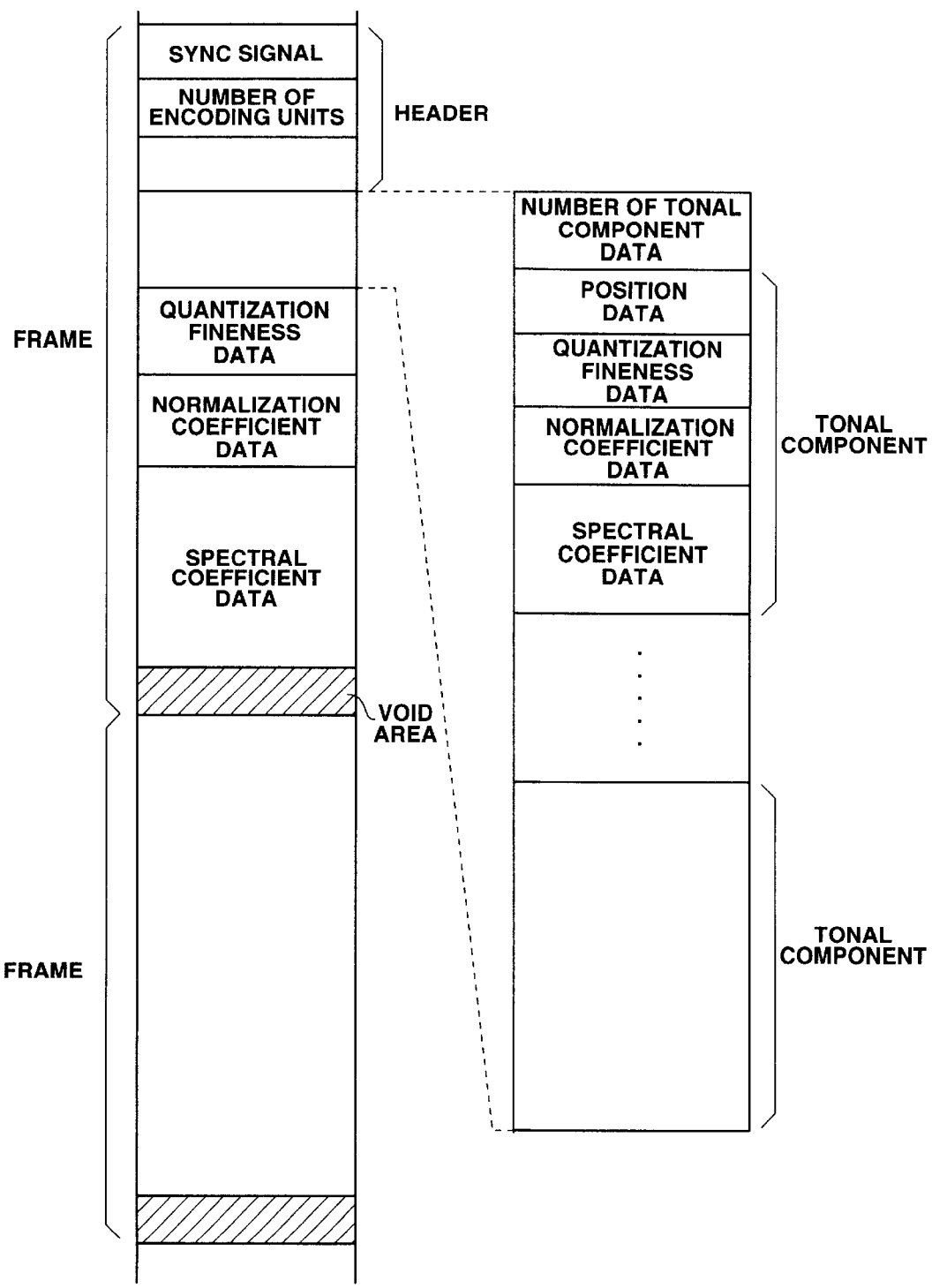
FIG. 15 shows a structure of a codestring encoded by the encoding method of encoding the tonal and noise components divided from the signal components.

FIG. 15 shows an illustrative structure of a codestring in case of encoding by the method explained with reference to FIG. 14. In the present illustrative structure, there is arrayed, at the leading end of each frame, the information comprised of control data, such as sync signals and the encoded number of the encoding units, encoded with a pre-set number of bits, as a header portion. Next to the header portion is arrayed the information comprised of the encoded tonal component data as tonal component data.

As tonal component data, the information which is the encoded number of signal components in the tonal components is arrayed first and is followed by the information which is the encoded position information of the tonal components on the frequency axis, the information which is the encoded information on the normalization coefficients and the information which is the normalized, quantized and encoded tonal signal components, in this order.

Next to the tonal component data is arrayed the information which is the encoded data of the residual signal left after subtraction of the tonal signal components from the original spectral signal components. This residual signal can also be termed noisy signal components. This residual signal is comprised of quantization fineness data and normalization coefficient data of each encoding unit and spectral component signals normalized and quantized based on the normalization coefficients data and the quantization fineness data (signal components other than the tonal components) encoded in the order of the increasing frequency of the encoding units. It is noted that spectral signal components of the tonal and other signal components (coefficient data) are encoded by VLC.

Figure 16:
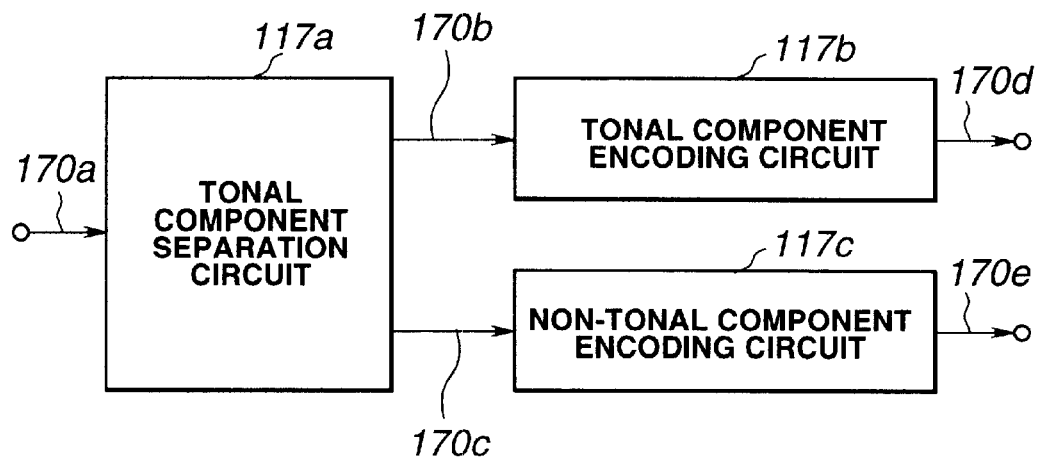
FIG. 16 is a block circuit diagram showing an illustrative structure of a signal component encoding circuit for encoding the tonal and and noise components divided from the signal components.

FIG. 16 shows an illustrative example of the signal component encoding circuit 111*b* of FIG. 4 when separating the tonal signal components from the above-mentioned respective signal components.

In the signal component encoding circuit 111*b*, shown in FIG. 16, the signal components 170*a* (110*b*) sent from the conversion circuit 111*a* of FIG. 4 are sent to a tonal component separation circuit 117*a*. The signal components 170*a* are separated into tonal signal components 170*b* and other signal components 170*c* (non-tonal signal components). The tonal signal components 170*b* are sent to a tonal component encoding circuit 117*b*, while the non-tonal signal components 170*c* are sent to a non-tonal component encoding circuit 117*c*. The tonal component encoding circuit 117*b* and the non-tonal component encoding circuit 117*c* encodes the signal components supplied thereto to output resulting output signals 170*d*, 170*e*. The tonal component encoding circuit 117*b* generates the information constituting the tonal component data of FIG. 15, at the same time as it encodes the information constituting the tonal component data. The signal encoding arrangements in the tonal component encoding circuit 117*b* and in the non-tonal component encoding circuit 117*c* are the same as those shown in FIG. 6.

Figure 17:
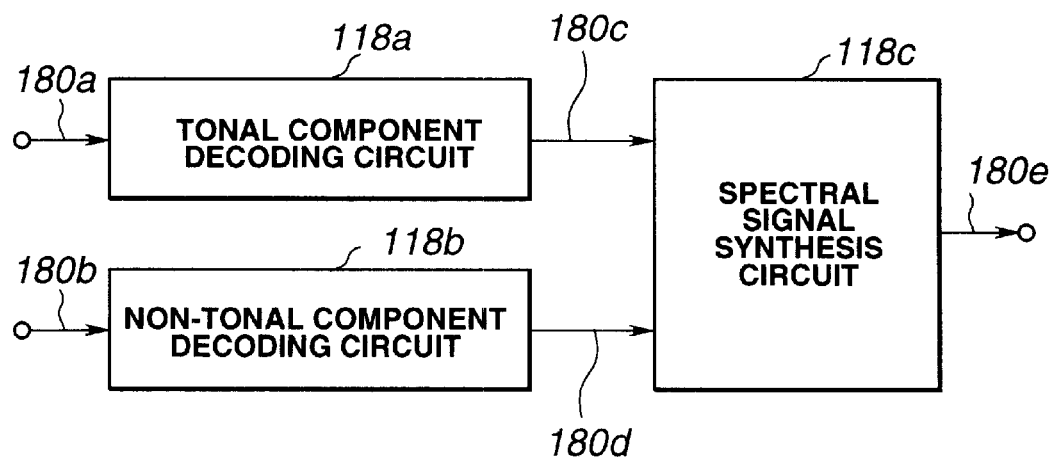
FIG. 17 is a block circuit diagram showing an illustrative structure of a signal component decoding circuit for decoding the encoded tonal and and noise components divided from the signal components.

FIG. 17 shows an illustrative example of the signal component decoding circuit 114*b* of FIG. 7 in case the tonal signal components have been separated from the respective signal components.

In the signal component decoding circuit 114*b*, shown in FIG. 17, the code 140*b* supplied from the codestring resolution circuit 114*a* of FIG. 7 are made up of tonal component data 180*a* and non-tonal component data 180*b*, which are sent to associated tonal component decoding circuit 118*a* and non-tonal component decoding circuit 118*b*, respectively. The tonal component decoding circuit 118*a* decodes the tonal signal components from the tonal component data shown in FIG. 15 to output resulting tonal signal components 180c. The non-tonal component decoding circuit 118b decodes the tonal signal components from the non-tonal component data to output resulting non-tonal signal components 180d. These tonal signal components 180c and the non-tonal signal components 180d are both sent to a spectral signal synthesis circuit 118c, which then synthesizes the tonal signal components and the non-tonal signal components based on the above-mentioned position data to output the resulting signal components 180e. The decoding configurations of the tonal component decoding circuit 118a and the non-tonal component decoding circuit 118b are the same as those shown in FIG. 9.

It is assumed that an encoding technique, termed herein as an old standard or A-codec, has been developed, the recording format on a disc has been standardized, using this technique, and subsequently an encoding technique of higher efficiency expanded from the A-codec, termed herein the new standard or B-codec, has been developed. In this case, signals encoded by the B-codec can be recorded on the same type of the disc as that on which signals by the A-codec are recorded. If the signals by the B-codec can be recorded as those by the A-codec, disc usage can be expanded with advantage because signals can be recorded for longer time on the disc or the signals can be recorded to a higher sound quality.

In the technique disclosed in the Japanese Patent Application 9-42514, this is realized so that, in case of a codestring previously designed to permit long-time reproduction for a small number of channels, as in the case of the recording format shown in FIG. 13 or recording monaural signals as shown in FIG. 12, a smaller number of bits than the total number of bits that can be allocated to each frame are allocated to the small number of channels. Stated differently, a smaller number of bits than the total number of bits that can be allocated to each frame are used for the A-codec so that a void recording area will be produced in the frame, and signals of the channels not reproduced by the old standard accommodating device, that is the B-codec signals, are recorded in the void area thus produced to enable multi-channel recording/reproduction (recording/reproduction of both A- and B-codecs) for the long time mode. If, in this technique, the signals of the channel not reproduced by the old standard accommodating recording device are encoded by a method more efficient than the signals of the channel reproduced by the old standard accommodating recording device, it is possible to suppress lowering of the sound quality otherwise caused by the reduction in the number of bits allocated to the signals reproduced by the old standard accommodating recording device for a multi-channel system.

Figure 18:
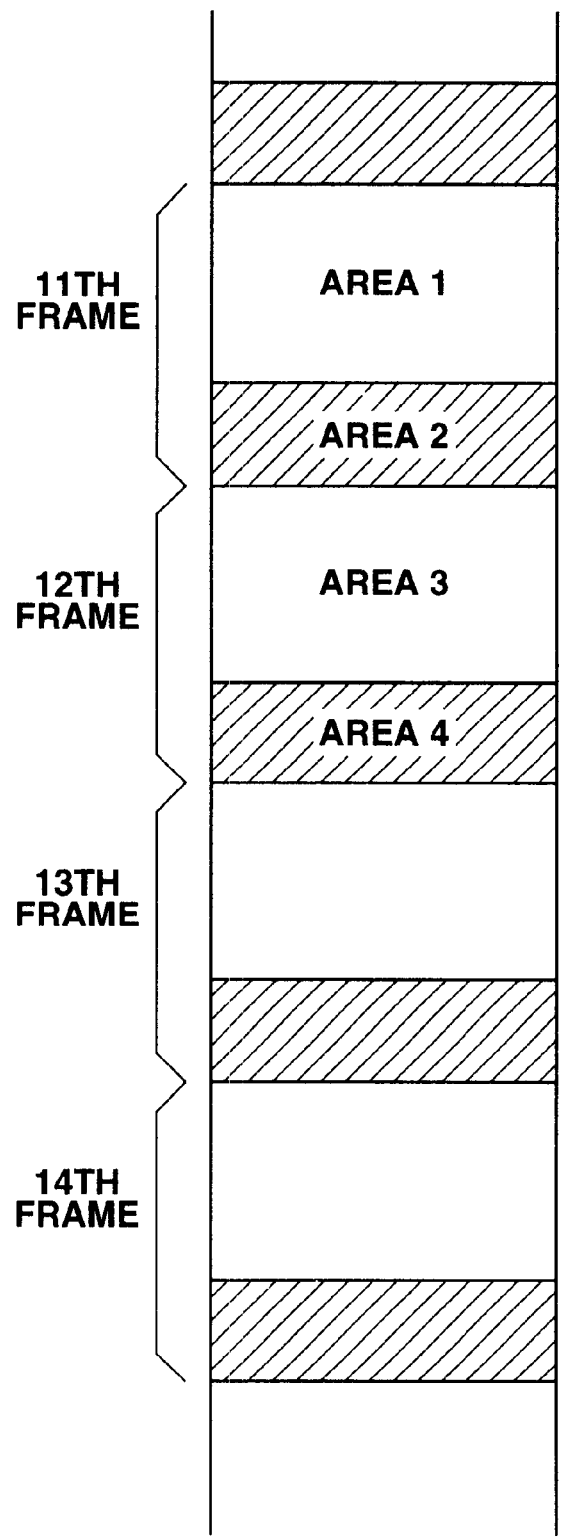
FIG. 18 illustrates the recording format in case of recording the codestring of the A-codec.

FIG. 18 shows ab illustrative example of a codestring obtained on application of the technique disclosed in the above-identified Japanese Patent Application 9-42514.

In the example of FIG. 18, each frame made up of a pre-set number of bits is separated into two areas. Specifically, signals of the channel (L+R)/2, encoded by the above-mentioned A-codec encoding method, are recorded in areas 1 and 3, while signals of the channel (L−R)/2, encoded by the above-mentioned B-codec encoding method, are recorded in shaded areas 2 and 4, which represent the above-mentioned void recording areas.

The A-codec encoding method corresponds to the encoding method explained with reference to FIG. 11. The B-codec encoding method may be exemplified by an encoding method consisting in encoding signals converted into spectral signal components by a transform block length equal to twice that of the A-codec by the encoding method shown in FIG. 15. It is noted that the conversion block length of the B-codec is twice the conversion block length o the A-codec so that the signals corresponding to the conversion block is recorded across two frames.

In the example of FIG. 18, the fixed length encoding method is used for the A-codec. Therefore, the number of bits used in a codestring obtained by the above-mentioned A-codec encoding method (referred to hereinafter as the A-codec codestring) can be calculated easily. If the number of bits used by the A-codec can be calculated, the leading position of the codestring obtained by the above-mentioned B-codec encoding method (referred to hereinafter as the B-codec codestring) can be calculated easily. Alternatively, the B-codec codestring can be adapted for beginning from the trailing end of a frame. In this case, the leading position of the B-codec codestring can be known readily even if a variable-length encoding method, for example, is used as the A-codec encoding method. If the leading position of the B-codestring can be calculated easily in this manner, it becomes possible for the reproducing device accommodating both the A-codec and the B-codec (new standard accommodating reproducing device) to process both of the codestrings promptly by a parallel operation thus enabling high-speed processing.

If the A-codec encoding method contains the information on the number of encoding units, as in FIG. 11, and the bandwidth of the channel encoded by the A-codec encoding method is narrowed for securing an area for recording signals of other channels (void recording area) as described above, the quantization fineness data or the normalization coefficient data on the high frequency side, for example, can be omitted conveniently. In this case, the number of bits used for encoding by the A-codec encoding method can be calculated easily.

In the above-described embodiment of FIG. 18, the (L+R)/2 channel signals are recorded as an A-codec codestring, whereas the (L−R)/2 channel signals are recorded as a B-codec codestring. Thus, if only the area having the A-codec signals, for example, recorded therein, is reproduced and decoded, (L+R)/2 monaural signals can be reproduced, whereas, if both an area having A-codec signals recorded therein and an area having B-codec signals recorded therein are reproduced and decoded, and the sum of the two decoded signals is found, the right (R) channel signals can be reproduced. On the other hand, if the difference between the two decoded signals is found, the left (N) channel signals can be reproduced, thus enabling stereo reproduction.

The old standard accommodating reproducing device disregards, in the recording medium having the codestring of FIG. 18 recorded thereon, the above-described area encoded by the B-codec encoding method, so that monaural signals can be reproduced from the recording medium having the above-mentioned codestring recorded thereon.

On the other hand, stereo signals can be reproduced from a recording medium, having recorded thereon the codestring shown in FIG. 18, by a reproducing device carrying both an A-codec decoding circuit and a B-codec decoding circuit (reproducing device accommodating the new standard). Thus, if, after the coming into widespread use of the old standard accommodating reproducing device, the new standard accommodating reproducing device has introduced the encoding method shown in FIG. 18, as a standard for stereo reproduction, the old standard accommodating reproducing device can reproduce monaural signals. Meanwhile, since the decoding circuit for decoding the A-codec codes can be implemented by a hardware of a relatively small scale, the reproducing device carrying such decoding circuit can be fabricated at a low cost.

It should be noted that, if the signals of the A-codec and the B-codec are encoded with a number of bits smaller than the number of bits allocatable to a frame, the number of bits allocated to the encoding of the A-codec is reduced as compared to the case of allocating the totality of bits of a frame to the coding of the A-codec, thus lowering the sound quality in case of reproduction by the old standard accommodating reproducing device. However, in the technique disclosed in the above-mentioned Japanese Patent Application 9-42514, there is employed an encoding method for the B-codec higher in encoding efficiency than the A-codec encoding method such as using a transform block of longer time duration, so that a smaller number of bits used for the B-codec encoding method suffices and hence a larger number of bits can be utilized for the A-codec encoding method thus reducing the deterioration in sound quality.

Figure 19:
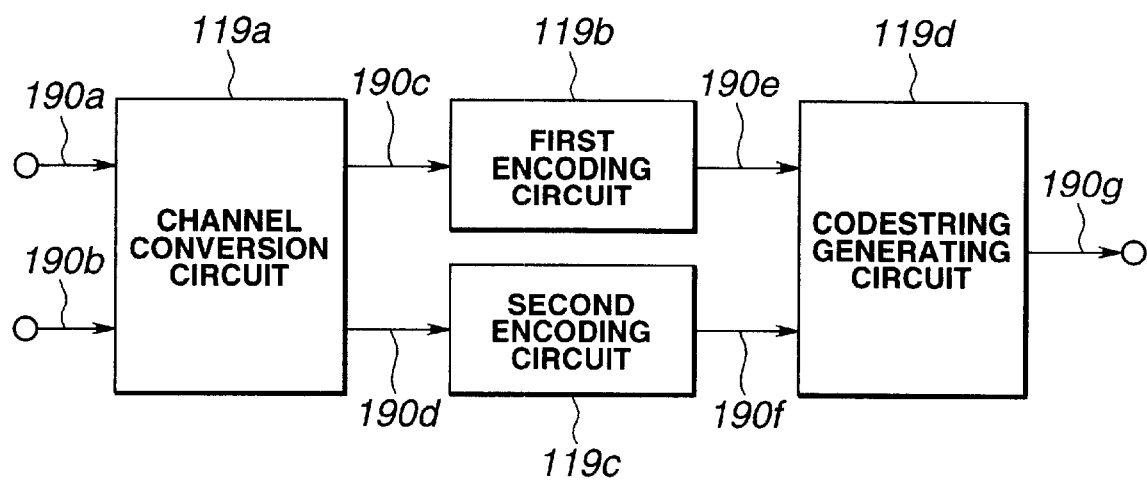
FIG. 19 is a block circuit diagram showing an illustrative structure of an encoding device generating the codestring of FIG. 18.

FIG. 19 shows an illustrative structure of an encoding circuit for generating a codestring of FIG. 18 using the above-described method of the present invention.

In FIG. 19, L-channel input signal 190a and a R-channel input signal 190b are converted by a channel conversion circuit 119a into a signal 190c corresponding to (L+R)/2 and to a signal 190d corresponding to (L−R)/2, respectively. The (L+R)/2 signal 190c and the (L−R)/2 signal 190d are sent to a first encoding circuit 119b and to a second encoding circuit 119c, respectively.

The first encoding circuit 119b is equivalent to the signal component encoding circuit 111b of FIG. 4 having the configuration of FIG. 6. To this first encoding circuit 119b is applied the above-described A-codec encoding method. On the other hand, the second encoding circuit 119c has a transformation block length twice as long as the first encoding circuit 119b, and is equivalent to the signal component encoding circuit 111b, having the configuration of FIG. 16. To this second encoding circuit 119b is applied the above-described B-codec encoding method. The A-codec codestring 190e of the first encoding circuit 119b and the B-codestring 190f of the second encoding circuit 119c are both sent to a codestring generating circuit 119d.

This codestring generating circuit 119d generates a codestring, shown in FIG. 18, from the codestrings 190e, 190f, to output the generated codestring as an output codestring signal 190g.

Figure 20:
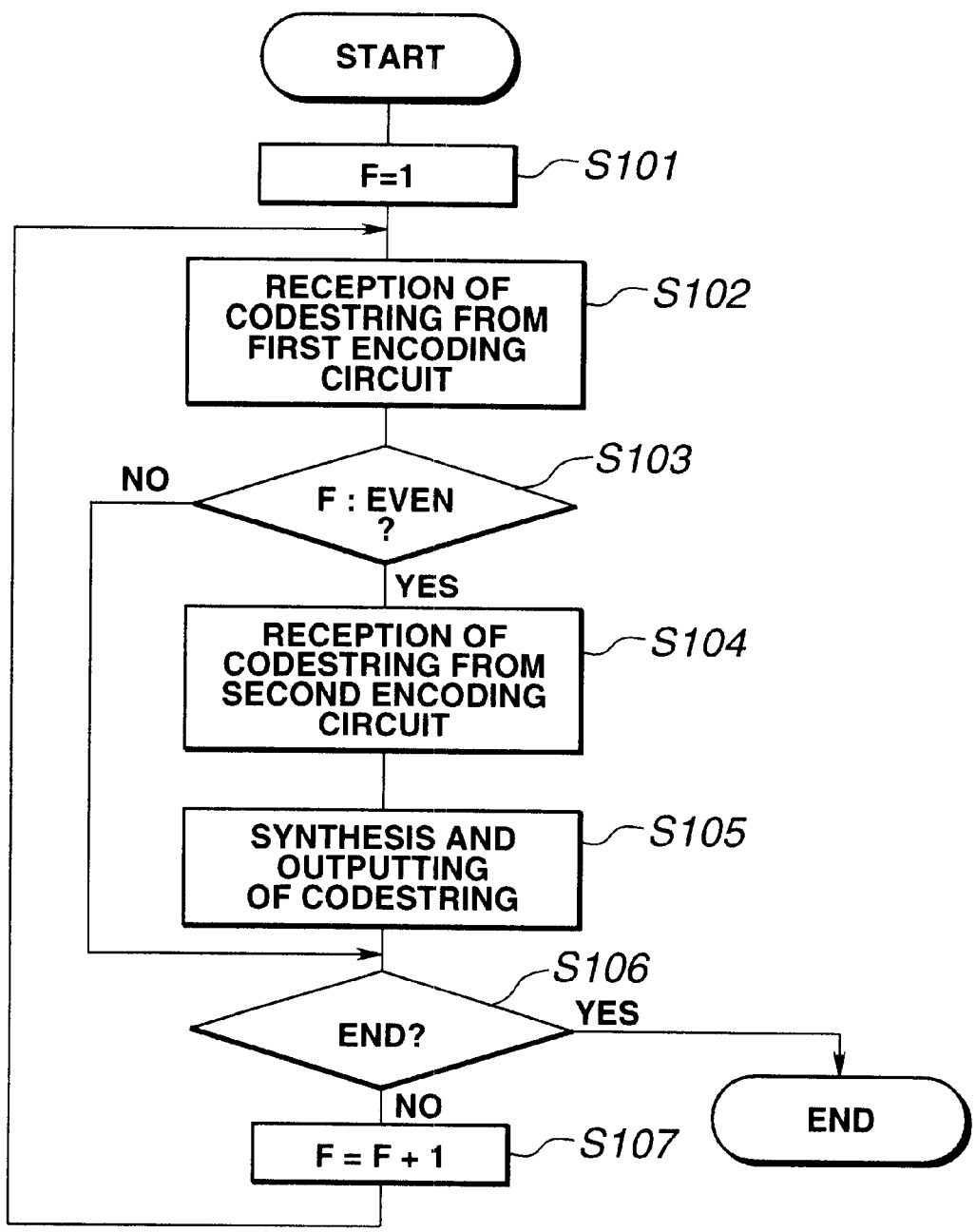
FIG. 20 is a flowchart for illustrating the processing at the time of generating the codestring of FIG. 18 by the codestring generating circuit of FIG. 17.

FIG. 20 shows the processing flow for the codestring generating circuit 119d of FIG. 19 to generate a codestring of FIG. 18.

In FIG. 20, the frame number F is initialized to 1 at step S101. At the next step S102, an A-code string 190e is received from the first encoding circuit 119b. At step S103, it is judged whether or not the frame number F is odd or even. If the frame number is not even, processing transfers to step S106 and, if the frame number is even, processing transfers to step S104.

At step S104, a B-codec codestring 190f from the second encoding circuit 119c is received. At the next step S105, the above-mentioned codestring of FIG. 18 is synthesized from the codestrings 190e, 190f.

At step S106, it is checked whether or not processing for all frames has come to a close. If the result is YES, processing of FIG. 20 is terminated and, if otherwise, the frame number F is incremented by one at step S107 before processing reverts to step S102 to repeat the above processing.

In the processing of FIG. 20, the frame number F begins at 1. However, since the processing unit of the encoding method for the B-codec is two frames, which is twice that used in the A-codec encoding method, the codestring is generated every two frames.

Figure 21:
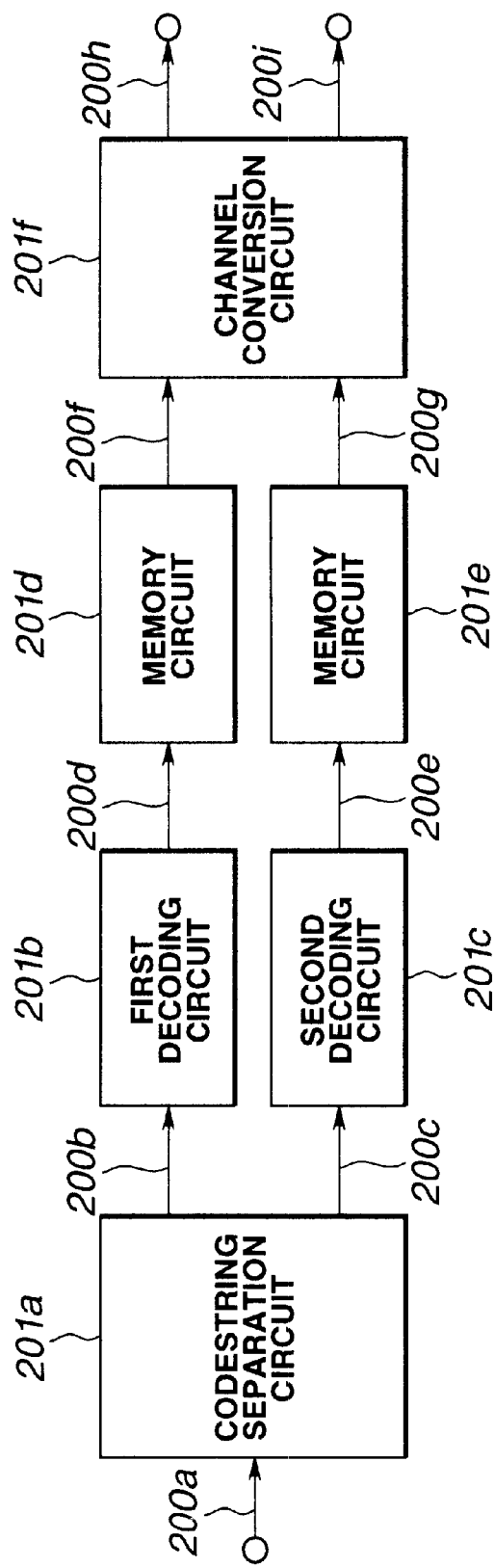
FIG. 21 is a block circuit diagram showing an illustrative structure of a decoding circuit adapted for decoding the codestring of FIG. 18 generated using the encoding method of the present invention.

FIG. 21 shows an illustrative structure of a decoding circuit of the new standard accommodating reproducing device adapted for decoding the codestring of FIG. 18 generated by the above-described encoding method of the present invention.

In FIG. 21, an input codestring 200a, which is a codestring of FIG. 18, is separated by a codestring separation circuit 201a into the A-codec codestring 200b and a B-codec codestring 200c, which are sent to a first decoding circuit 201b and a second decoding circuit 201c, respectively.

The first decoding circuit 201b is equivalent to the signal component decoding circuit 114b of FIG. 7 and operates for decoding the A-codec codes. The second decoding circuit 201c, having a conversion block length twice that of the second decoding circuit 201b, is equivalent to the signal component decoding circuit 114b having the configuration of FIG. 7 and operates for decoding the B-codec codes. A signal 200d decoded by the first decoding circuit 201b is equivalent to the signal (L+R)/2 190c, whilst a signal 200e decoded by the second decoding circuit 201c is equivalent to the signal (L−R)/2 190d.

Since the signal (L+R)/2 200d and the signal (L−R)/2 200e are of different conversion block lengths and hence are of different processing time delays, the signal (L+R)/2 200d from the first decoding circuit 201b and the signal (L−R)/2 200e from the second decoding circuit 201c are sent to a memory circuit 201d and to a memory circuit 201e, respectively, where the above-mentioned processing time delays are absorbed. The signal (L+R)/2 200f and the signal (L−R)/2 200e, passed through the memory circuits 201d, 201e, are sent to a channel conversion circuit 201f.

This channel conversion circuit 201f sums the signal (L+R)/2 200f and the signal (L−R)/2 200g to generate a L-channel signal 200h, while subtracting the signal (L−R)/2 200g from the signal (L+R)/2 200f to generate a R-channel signal 200i to output these L and R channel signals.

Figure 22:
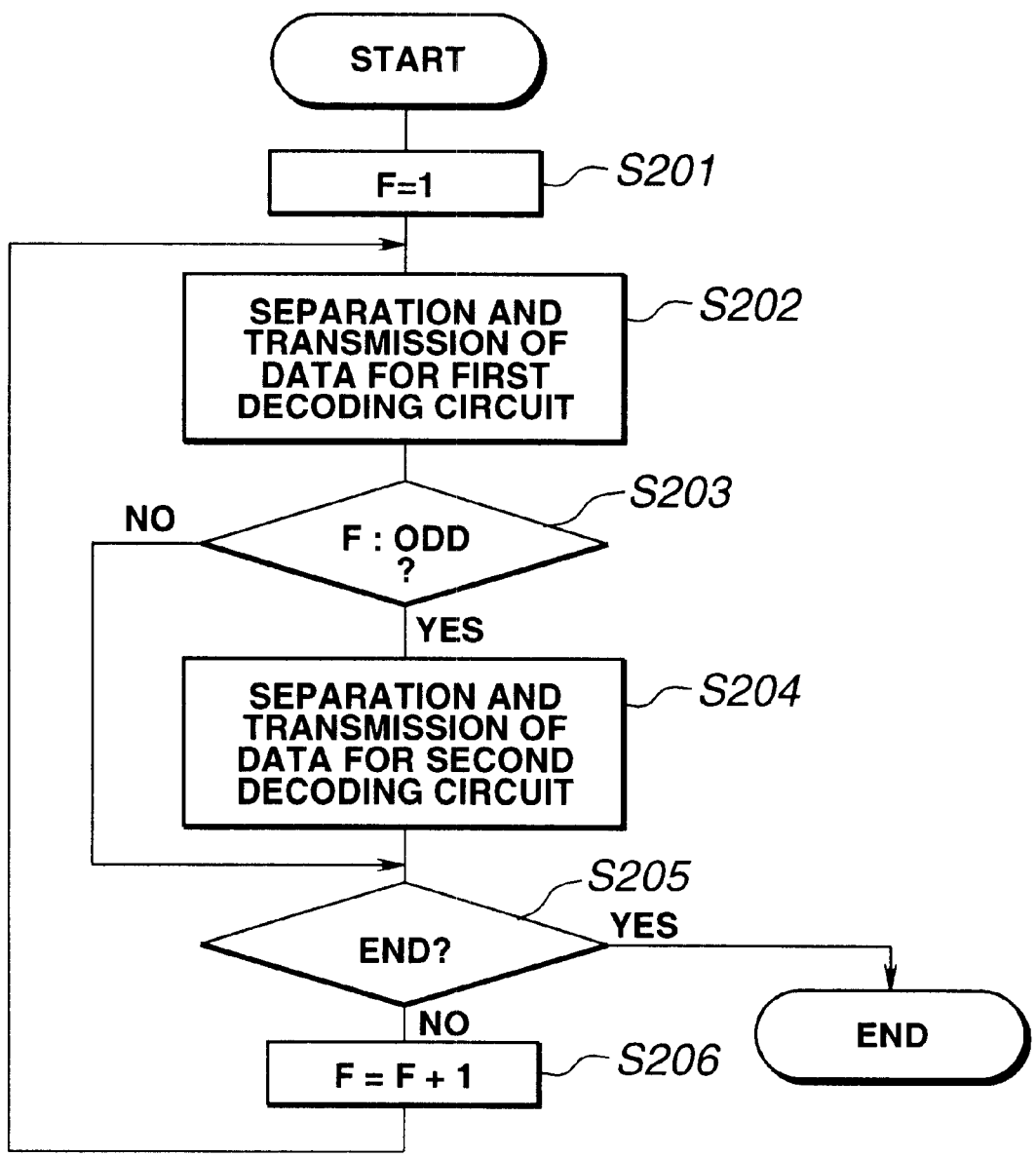
FIG. 22 is a flowchart showing the processing flow when separating the codestring of FIG. 18 by the codestring separating circuit of FIG. 21.

FIG. 22 shows the processing flow when the codestring separation circuit 201a of FIG. 21 separates the codestring of FIG. 18.

In FIG. 22, the frame number F1 is initialized at step S201 to 1. At step S202, the A codec codestring to be sent to the first decoding circuit 201b is separated and sent. At step S203, it is checked whether or not the frame number F is odd or even. If the frame number F is not odd, processing transfers to step S205 and, if otherwise, processing transfers to step S204.

At step S204, the B-codec codestring for sending to the second decoding circuit 201c is separated and sent.

At step S205, it is checked whether or not processing for all frames has come to a close. If the result is YES, processing of FIG. 22 is terminated and, if otherwise, the frame number F is incremented by one at step S206 before processing reverts to step S202 to repeat the above processing.

In the processing of FIG. 22, the frame number F begins at 1. However, since the processing unit of the encoding method for the B-codec is two frames, which is twice that of the A-codec encoding method, the codestring is separated every two frames.

In the above description of the preferred embodiment, only signals of an additional channel (B-codec signals) are recorded in a void recording area of each frame. As discussed in connection with the prior art, problems are sometimes raised as to the quantization noise generated on encoding, depending on the type of stereo signals.

A method embodying the present invention for solving this problem is hereinafter explained.

Figure 23:
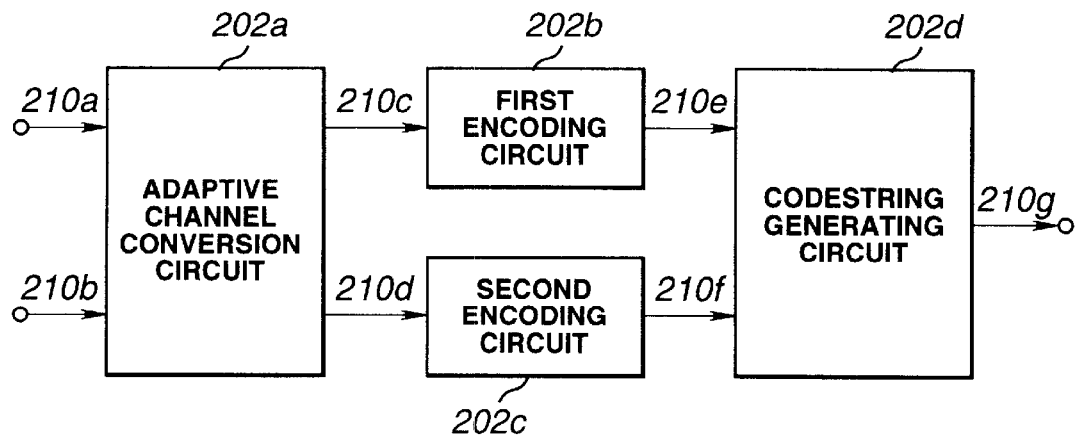
FIG. 23 is a block circuit diagram showing an illustrative structure of an encoding device adapted for adaptive channel conversion as an embodiment of the present invention.

FIG. 23 shows an embodiment of an encoding device according to the present invention. It is noted that the configuration shown in FIG. 23 is similar to that of the encoding device of FIG. 19 except an adaptive channel conversion circuit 202a.

In FIG. 23, a L-channel input signal 210a and a R-channel input signal 210b are processed by the adaptive channel conversion circuit 202a with adaptive channel conversion, as will be explained subsequently. Specifically, the L-channel input signal 210a and the R-channel input signal 210b are converted by the adaptive channel conversion circuit 202a into a (L'+R')/2 signal 210c and a (L'−R')/2 signal 210d which will be explained subsequently. The (L'+R')/2 signal 210c and the (L'−R')/2 signal 210d are sent to a first encoding circuit 202b and a second encoding circuit 202c, respectively.

The first encoding circuit 202b is of the same structure as the first encoding circuit 119b of FIG. 19 and the encoding method of the A-codec is applied. The second encoding circuit 202c has the same structure as the second encoding circuit 119c of FIG. 19. An A-codec codestring 210e of the first encoding circuit 202b and a B-codec codestring 210f of the second encoding circuit 202c are both sent to a codestring generating circuit 202d.

This codestring generating circuit 202d has the same structure as the codestring generating circuit 119b of FIG. 19 and outputs from the codestrings 210e and 210f an output codestring signal 210g analogous to the output codestring signal 190g of FIG. 19.

Figure 24:
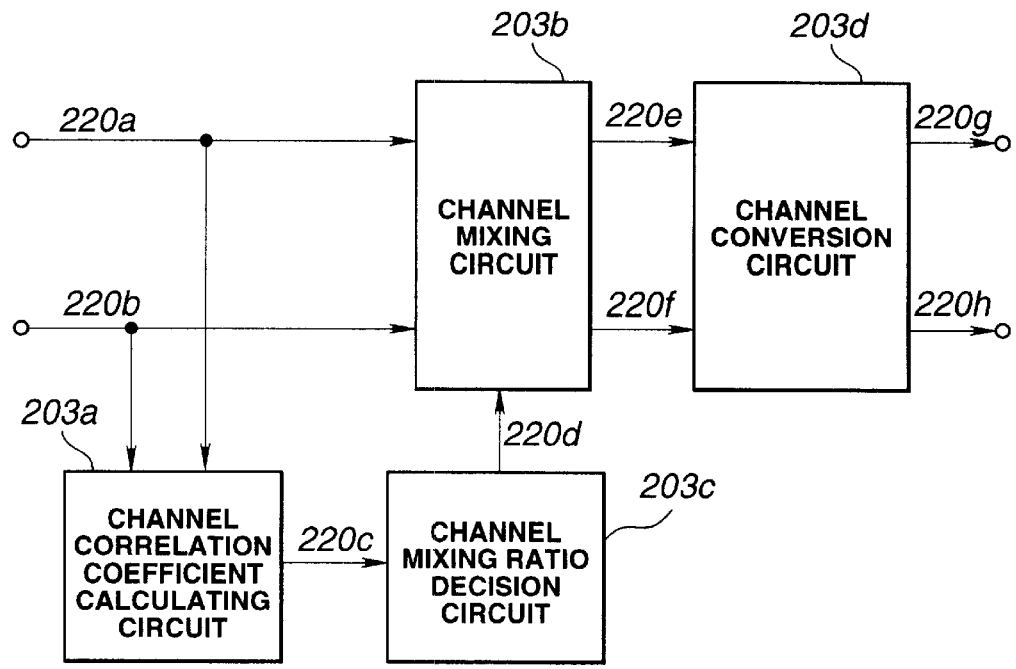
FIG. 24 is a block circuit diagram showing the structure of an illustrative embodiment of the adaptive channel conversion circuit of FIG. 23.

FIG. 24 shows a specified structure of the adaptive channel conversion circuit 202a of FIG. 23. In the adaptive channel conversion circuit 202a of FIG. 24, the processing unit of the second encoding method, that is the B-codec, is twice that of the first encoding method, that is the A-codec. Therefore, the channel conversion processing in the adaptive channel conversion circuit 202a occurs every two frames.

A L-channel input signal 210a and a R-channel input signal 210b are sent to a channel correlation coefficient computing circuit 203a and a channel mixing circuit 203b, respectively. The channel correlation coefficient computing circuit 203a computes the channel correlation coefficient R_C in accordance with the following equation:

R_c=S_lr/(S_l*S_r)

where S_l and S_r denote standard deviations of L and R channels and S_lr denotes the covariance of the L and R channels. The channel correlation coefficient assumes a value ranging from −1.0 to 1.0. That is, the channel correlation coefficient assumes the value of 1.0 and −1.0 if the increasing and decreasing states of both channels are completely equal to each other and if otherwise, respectively, while assuming a value close to 0 if there is no correlation whatsoever. That is, R_c=1.0 and R_c=−1.0 in case of a monaural signal with both channels equal to each other and a stereo signal where the two channels are of opposite phase to each other, respectively. In usual stereo signals, R_c has a value equal to 0.5 or larger in many cases. The channel correlation coefficient R_c, as found by the channel correlation coefficient computing circuit 203a, is sent to the channel correlation coefficient computing circuit 203a is sent as a signal 220c to a channel mixing ratio setting circuit 203c.

The channel mixing ratio setting circuit 203c sets the channel mixing ratio R_m from the channel correlation coefficient R_c.

Figure 25:
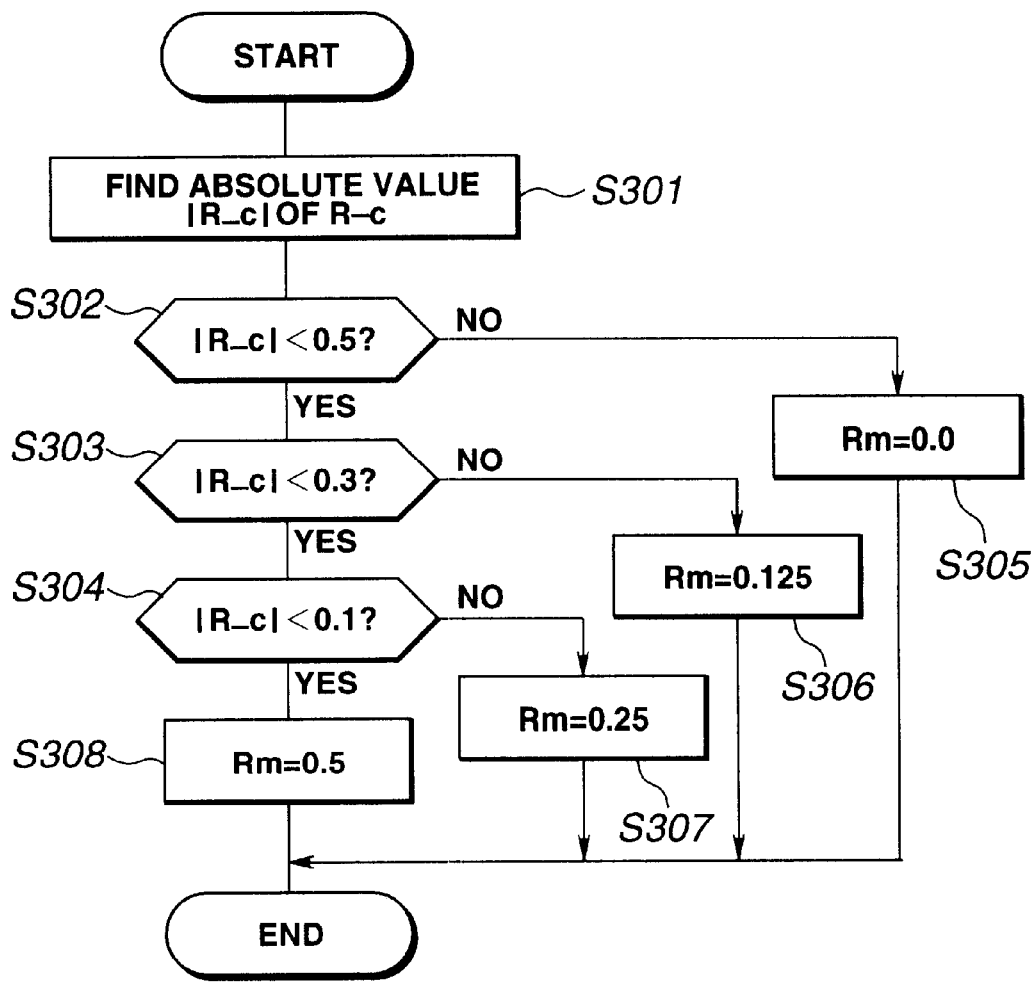
FIG. 25 is a flowchart showing the processing flow at the time of determining the channel mixing ratio R_m in a channel mixing ratio determining circuit of FIG. 24.

FIG. 25 shows a flowchart for the channel mixing ratio setting circuit 203c to set the channel mixing ratio R_m.

In FIG. 25, an absolute value |R_c| of the channel correlation coefficient R_c, supplied from the channel correlation coefficient computing circuit 203a, is first found at step S301. Then, at step S302, it is checked whether or not |R_c|<0.5. If |R_c|<0.5, processing transfers to step S303 and, if otherwise, processing transfers to step S305 where R_m=0.0 is set.

On the other hand, it is checked at step S303 whether or not |R_c|<0.3. If |R_c|<0.3, processing transfers to step S304 and, if otherwise, processing transfers to step S306 where R_m=0.125 is set.

At step S304, it is checked whether or not whether or not |R_c|<0.1. If |R_c|<0.1, processing transfers to step S308 to set R_m=0.5. If otherwise, processing transfers to step S307 where R_m−0.25 is set.

Although the reference value of comparison to the absolute value |R_c| and the channel mixing ratio R_m in the flowchart of FIG. 25 can be set freely, it is desirable to select value of R_m so as to be larger the smaller the value of |R_c| and to select the value of R_m so as to be in a range from 0.0 to 0.5.

The value of the channel mixing ratio R_m can be calculated as follows from a mathematical equation:

$$R\_m = 10^{(-3/20 \times (10 \times |R\_c| + 1))}.$$

Returning to FIG. 24, the channel mixing ratio R_m as found by the channel mixing ratio setting circuit 203c is sent as a signal 220d to the channel mixing circuit 203b. This channel mixing circuit 203b mixes the input signals 220a, 220b based on the channel mixing ratio R_m to output signals 220e, 220f resulting from the mixing. The output signals 220e, 220f resulting from the mixing are sent to a channel conversion circuit 203d.

Figure 26:
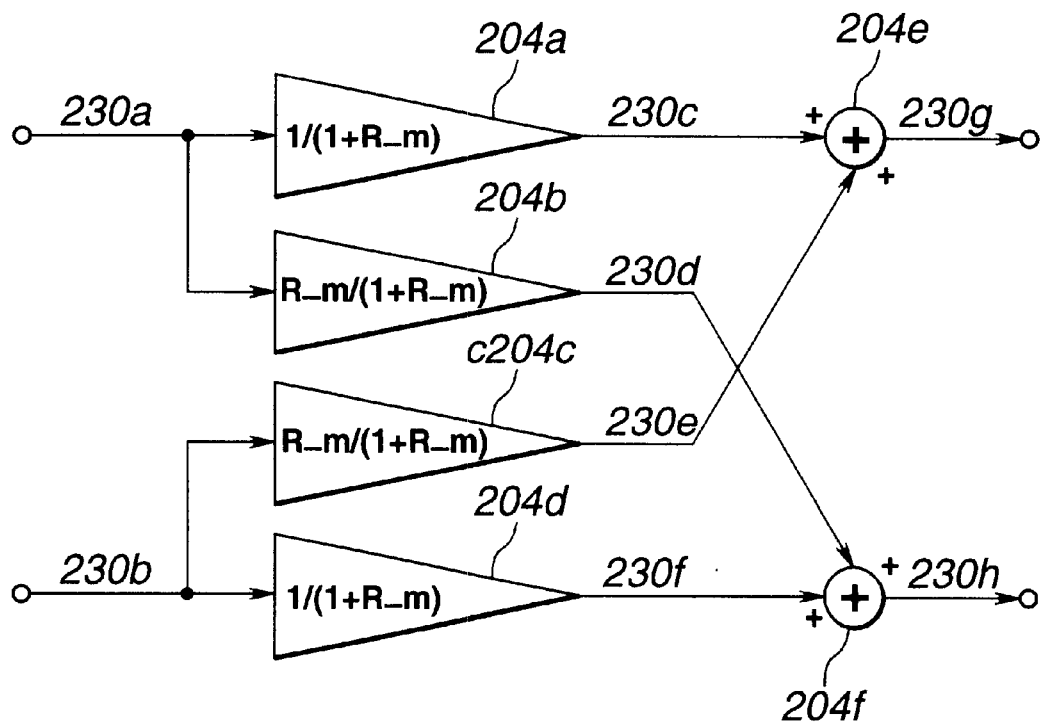
FIG. 26 is a block circuit diagram showing an illustrative example of the channel mixing circuit of FIG. 24.

FIG. 26 shows an illustrative structure of the channel mixing circuit 203b shown in FIG. 24.

In FIG. 26, signals 230a, 230b correspond respectively to the L and R input signals of the L and R channels of FIG. 24. The L-channel signal 230a is supplied to multipliers 204a, 204b, whilst the R-channel signal 230b is supplied to multipliers 204c, 204d.

The multipliers 204a, 204d multiply the supplied signal with 1/(1+R_m) to output the multiplied signal, while the multipliers 204b, 204c multiply the supplied signal with R_m/(1+R_m) to output the multiplied signal. R_m is the value of the above-mentioned channel mixing ratio. Outputs of the multipliers 204a, 204b, 204c and 204d are issued as signals 230c, 230d, 230e and 230f.

The signals 230c and 230e from the multipliers 204a, 204c are summed by an adder 204e, while the signals 230d, 230f from the multipliers 204b, 204d are summed together by the adder 204f. An output 230g of the adder 204e corresponds to the output signal 220e from the channel mixing circuit 203b, while an output 230h of the adder 204f corresponds to the output signal 220f of the channel mixing circuit 203b.

If output signals 230g, 230h of the channel mixing circuit 203b, having the L and R channel input signals 230a, 230b, are denoted as L' and R' channels, the following calculations:

$$L'=(L+R\_m*R)/(1+R\_m)$$

$$R'=(R+R\_m*L)/(1+R\_m)$$

are executed in the illustrated case of the channel mixing circuit 203b.

Returning to FIG. 24, the channel conversion circuit 203d executes channel conversion processing substantially similar to that executed by the channel conversion circuit 119a of FIG. 19. That is, the channel conversion circuit 203d converts the L' channel signal 220e and the R' channel signal 220f from the channel mixing circuit 203b into a signal 220g corresponding to (L'+R')/2 and a signal 220h corresponding to (L'−R')/2, respectively. The signal 220g corresponding to (L'+R')/2 and the signal 220h corresponding to (L'−R')/2 are sent to the first encoding circuit 202b and to the second encoding circuit 202c of FIG. 23, respectively.

Although separate processing operations are carried out separately in the channel mixing circuit 203b and in the channel conversion circuit 203d in the embodiment of FIG. 24, these processing operations can be executed collectively at a time. That is, the channel mixing circuit 203b and the channel conversion circuit 203d can be assembled to a unitary structure.

Figure 27:
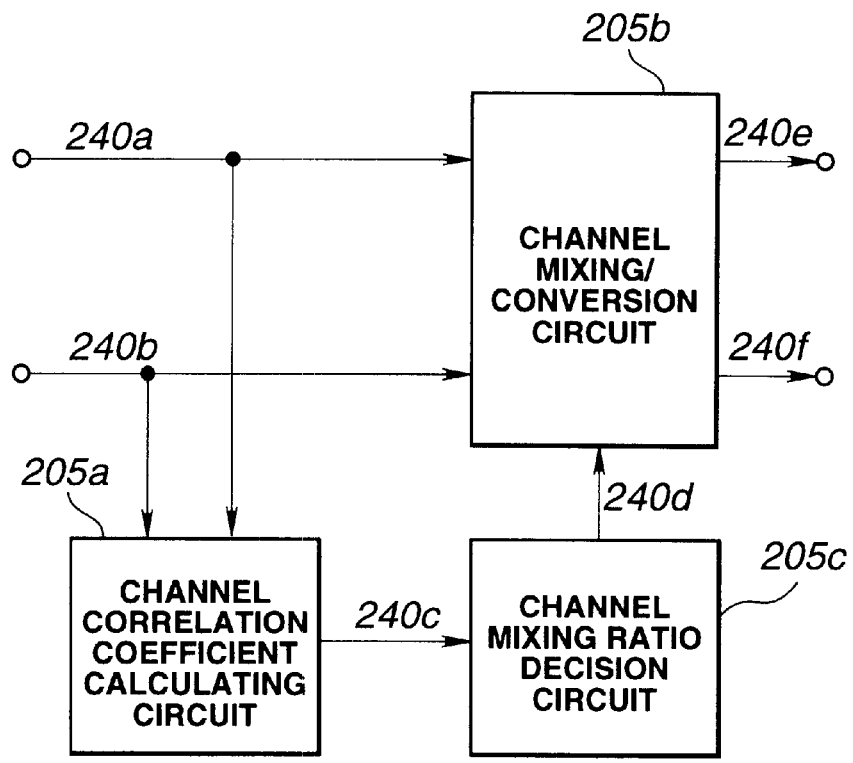
FIG. 27 is a block circuit diagram showing the structure of an illustrative example of an adaptive channel conversion circuit having a channel mixing conversion circuit combined from the cannel mixing circuit and the channel conversion circuit.

FIG. 27 shows an illustrative structure in which, as another illustrative structure of the adaptive channel conversion circuit 202a of FIG. 23, the channel mixing circuit 203b and the channel conversion circuit 203d are assembled together as a channel mixing conversion circuit 205b. In FIG. 27, the input signals 240a, 240b are identified with the input signals 220a, 220b of FIG. 24, while a channel correlation coefficient computing circuit 205a and the channel mixing ratio setting circuit 205c are identified with the channel correlation coefficient computing circuit 203a and the channel mixing ratio setting circuit 203c of FIG. 24, respectively. With the signals 240c, 240d being identified with the signals 220c, 220d of FIG. 24, respectively. Therefore, these signals or circuits are not explained specifically.

Figure 28:
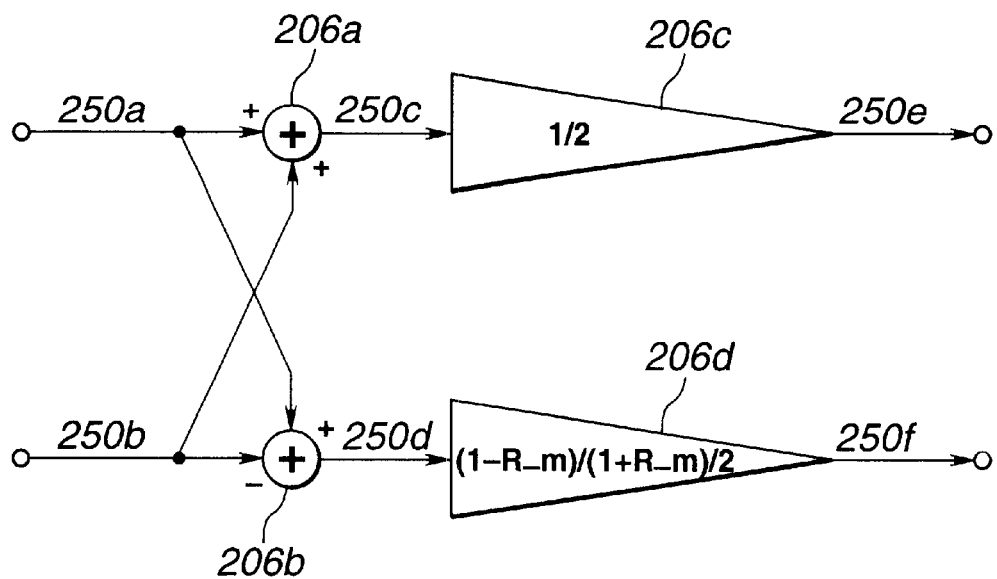
FIG. 28 is a block circuit diagram showing the structure of an illustrative example of the adaptive channel mixing conversion circuit shown in FIG. 27.

FIG. 28 shows an illustrative structure of the channel mixing conversion circuit 205b of FIG. 27.

In FIG. 28, signals 250a, 250b correspond to the L and R channel input signals 240a, 240b of FIG. 27, respectively.

The L-channel signal 250a and the R-channel signal 250b are fed to an adder 206a so as to be summed together. An output signal 250c of the adder 206a is entered to a multiplier 206c whereby it is multiplied by ½ and outputted as a signal 250e.

On the other hand, the L-channel signal 250a and the R-channel signal 250b are entered to a subtractor 206b for subtraction. The resulting difference signal is sent as a signal 250d to a multiplier 206d, which then multiplies the signal 250d by (1−R\_m)/(1+R\_m)/2 to output the resulting signal as a signal 250f.

If output signals 250e, 250f of the channel mixing circuit 205b, having the L and R channel input signals 250a, 250b, are denoted as A and B channels, the following calculations:

$$A=(L+R)/2$$

$$B=(L-R)(1-R\_m)/(1+R\_m)/2$$

are executed in the present embodiment of the channel mixing conversion circuit 205b.

The codestring generated by the above-described encoding device of FIG. 23 can be decoded using the decoding device shown in FIG. 21.

FIG. 29 shows input signals of the L and R channels and output signals of the L' and R' channels in the channel mixing circuit 203b of FIG. 24.

Figures 29A, 29B:
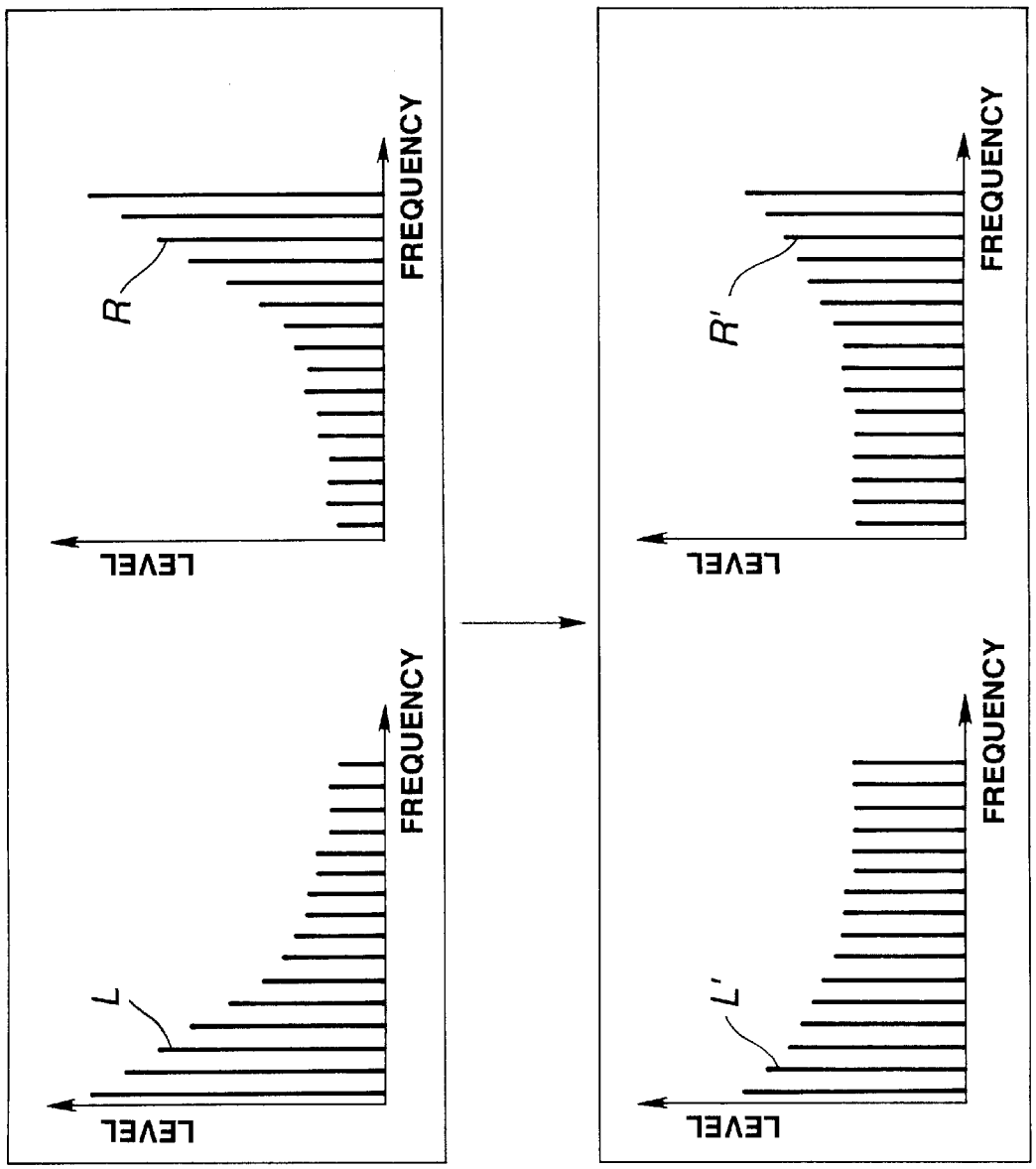
FIGS. 29A and 29B illustrate changes in the L and R channels in the channel mixing circuit of FIG. 24 and the output signals of the L' and R' signals.

If the stereo signals of the L and R channels, having frequency spectral components shown in FIG. 29A, that is signals having low inter-channel correlation, are entered to the channel mixing circuit 203b of FIG. 24 as input signals 220a, 220b, the signals 220e, 220f of the L' and R' channels, having the frequency signal components as shown in FIG. 29B are outputted by the channel mixing circuit 203b as a result of the above-described mixing in the channel mixing circuit 203b.

FIG. 30 shows the quantization noise produced on encoding and subsequently decoding signals 220e, 220f of the L' and R' channels shown in FIG. 29B. Specifically, FIGS. 30A and 30B show frequency signal components of the L' channel signals of FIG. 29B and those of the R' channel signals of FIG. 29B, respectively. FIGS. 30C and 30D show frequency signal components of signals obtained on converting the L' and R' channels to the (L'+R')/2 and (L'−R')/2 channels, respectively. The (L'+R')/2 and (L'−R')/2 channels are denoted as A and B channels, respectively.

Figure 30A:
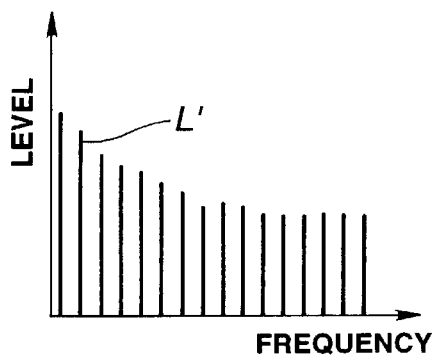
FIGS. 30A to 30H show the status of the quantization noise produced after decoding the L' and R' channels shown in FIG. 29B.
Figure 30B:
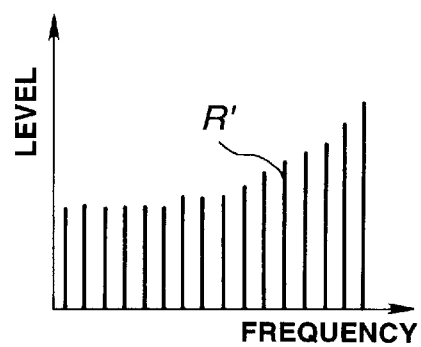
Figure 30C:
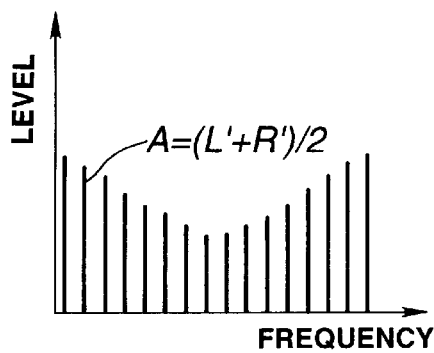
Figure 30D:
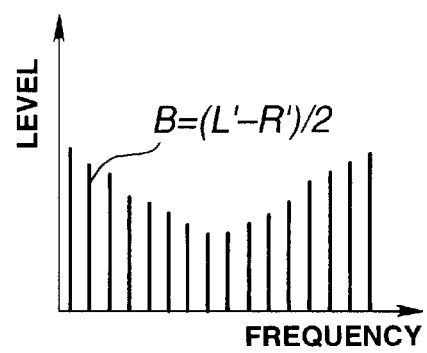
Figure 30E:
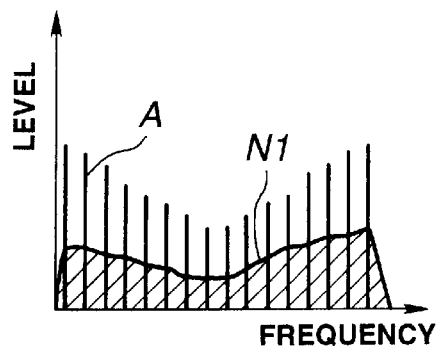
Figure 30F:
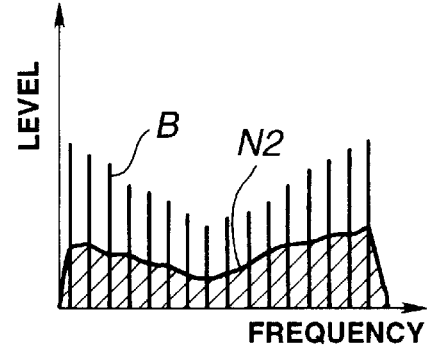

FIGS. 30E and 30F show the quantization noise produced on encoding the signals of the A and B channels by the above-described high efficiency encoding method and subsequently decoding the encoded A and B channel signals. In the drawing, N1 and N2 the frequency spectrum waveforms of the quantization noise components produced on encoding the A and B channel signals.

It is noted that the signal obtained on encoding and decoding the A channel and that obtained on encoding and decoding the B channel are denoted as (A+N1) and (B+N2), respectively.

Figure 30G:
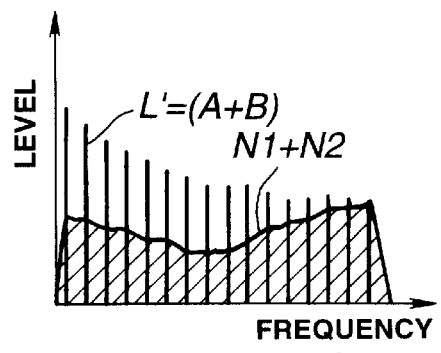
Figure 30H:
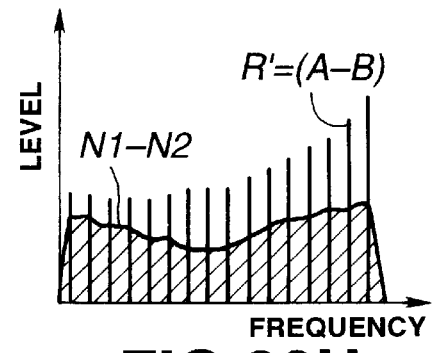

FIGS. 30G and 30H show the state in which respective channels of the stereo signals have been separated from the signal waveforms of (A+N1) and (B+N2). Specifically, the frequency signal components of the R' channel are canceled out by addition of (A+N1) and (B+N2) to retrieve only the frequency signal components of the L' channel. Similarly, the frequency signal components of the L' channel are canceled out by subtraction of (B+N1) from (A+N2) to retrieve only the frequency signal components of the R' channel.

To sum, FIGS. 30G and 30H represent the state of the quantization noise in case the signals of FIG. 29A has been processed by the method of the present invention.

Figure 2A:
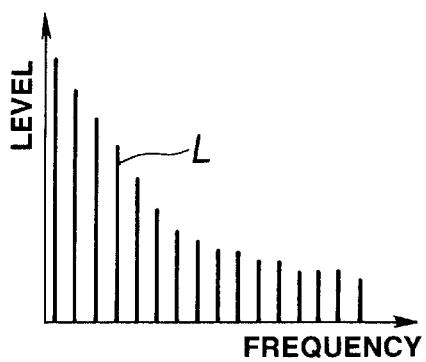
FIGS. 2A to 2H show the status of the quantization noise produced on encoding, decoding and reproducing stereo signals having no correlation between left and right channels.
Figure 2B:
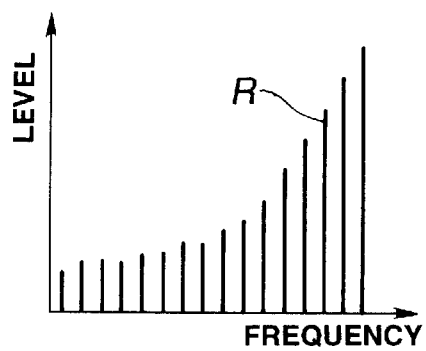
Figure 2C:
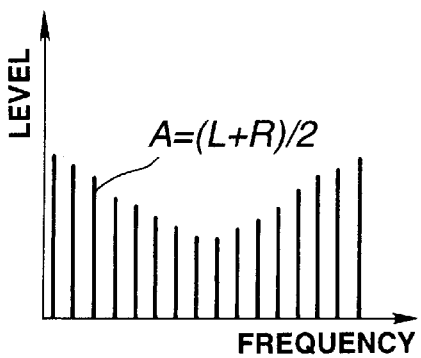
Figure 2D:
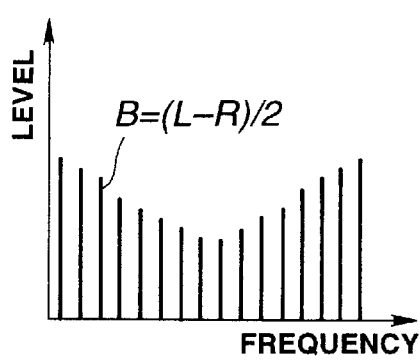
Figure 2E:
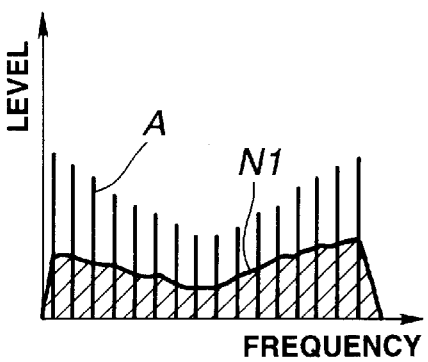
Figure 2F:
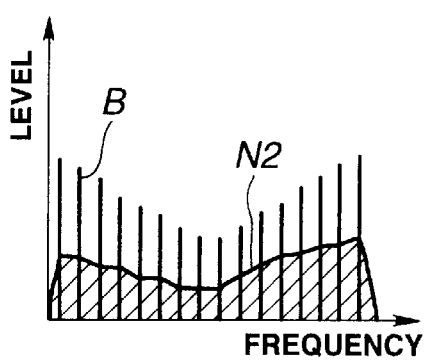
Figure 2G:
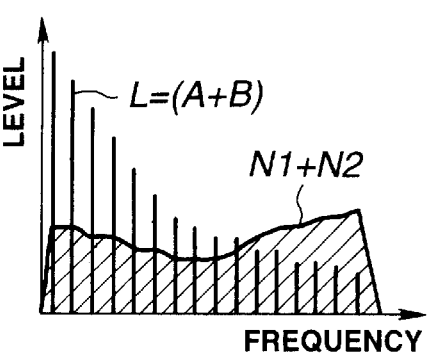
Figure 2H:
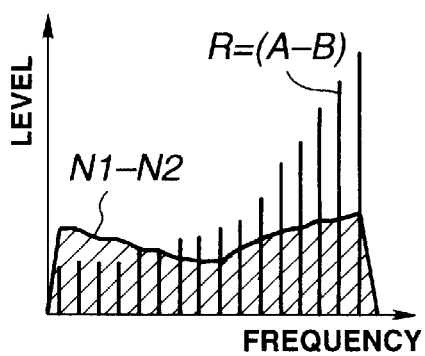

It should be noted that the signals of FIG. 29A corresponds to the signal shown in FIGS. 2A and 2B. It is seen that, if the prior-art technique is used, the quantization noise generated on encoding followed by decoding is as shown in FIGS. 2G and 2H. Thus, on comparison of FIGS. 30G and 30H to FIGS. 2G and 2H, it may be seen that the technique of the present invention suffers from the effect of the quantization noise to a lesser extent than the prior-art technique.

In the present invention, since the L and R channel signals of the stereo sound signals are converted into L' and R' channels, as shown in FIG. 29, the degree of inter-channel isolation is lowered, as a result of which the so-called diffusive sound feeling proper to the stereo signals on tentative hearing of the produced signals is lowered slightly. However, this lowering in the diffusive feeling is negligible compared to the effect of the quantization noise.

Thus, the present invention is directed to the encoding method which permits reproduction of a small number of channels with the old standard accommodating reproducing device and a large number of channels with the new standard accommodating reproducing device and which executes channel mixing based on the inter-channel correlation to minimize the sound quality deterioration. The present invention is also directed to a recording medium having recorded therein so-obtained encoded signals.

Such an encoding method has so far been described in which, by way of the first encoding method, the entire signals are split into two bands, the resulting band signals are orthogonally-transformed to produce spectral coefficients, these spectral coefficients are then normalized and quantized so as to be encoded by fixed length encoding, and in which, by way of the second encoding method, the entire signals are split into two bands, the resulting band signals are orthogonally-transformed to produce spectral coefficients, these spectral coefficients are then separated into tonal and other components which are separately normalized and quantized so as to be encoded by variable length encoding. This encoding method is merely illustrative such that various other methods may be contemplated. For example, the first encoding method may be such an encoding method in which time-domain signals obtained on band-splitting and decimation depending on bandwidths are normalized and quantized so as to be encoded by fixed length encoding, whilst the second encoding method may be such an encoding method in which the time-domain signal of the entire frequency spectrum are Orthogonally-transformed and the resulting spectral coefficients are normalized and quantized for encoding. As the second encoding method, such a technique as gives the optimum encoding efficiency is preferably used to minimize the lowering in the sound quality on reproduction by the old standard accommodating reproducing device to a minimum.

Although the foregoing description has been made of the case of recording an encoded bitstream on a recording medium, the present invention may also be applied to transmission of the bitstream over a transmission line such as a network. As the recording medium, not only a recording medium such as optical disc, but also other recording medium semiconductor memory, for example, may be used, if the recording medium used permits random accessing.

What is claimed is:

1. An encoding method comprising:
   generating mixing coefficients of a plurality of channel signals wherein said mixing coefficients are determined from inter-channel correlation coefficients;
   mixing said channel signals based on said mixing coefficients to form mixed channel signals;
   generating plural processing signals corresponding to said channel signals from the mixed channel signals;
   encoding a part of the processing signals utilizing a first encoding process; and
   encoding a remaining part of the processing signals utilizing a second encoding process; where said first encoding process differs from said second encoding process.

2. The encoding method as claimed in claim 1 wherein said mixing coefficients are determined to values that result in inter-channel correlation that is higher after said mixing than that before said mixing.

3. The encoding method as claimed in claim 1 wherein said inter-channel correlation coefficients are found from the covariance and standard deviation of the channel signals.

4. The encoding method as claimed in claim 1 wherein said mixing coefficients are determined to values which become smaller as the inter-channel correlation coefficients become larger.

5. The encoding method as claimed in claim 1 wherein said mixing coefficients are determined to values which become larger as the inter-channel correlation coefficients become smaller.

6. The encoding method as claimed in claim 1 wherein said mixing coefficients comprise plural coefficients such that the sum of coefficients for multiplication of the respective channels is equal to 1.

7. The encoding method as claimed in claim 1 wherein said second encoding process transforms time-domain processing signals into spectral signal in terms of a transform block of a pre-set length and encodes the resulting blocked spectral signals.

8. The encoding method as claimed in claim 7 wherein said first encoding process transforms the time-domain processing signals every transform block of a pre-set length into spectral signals and encodes the resulting spectral signals and wherein the transform block length when transforming the time-domain processing signals in said second encoding process into the spectral signals is longer than the transform block length when transforming the processing signals into spectral signals.

9. The encoding method as claimed in claim 7 wherein said second encoding process encodes spectral signals of a transform block across plural frames.

10. The encoding method as claimed in claim 1 wherein said second encoding process encodes signal components of the processing signals by variable length encoding.

11. The encoding method as claimed in claim 1 wherein said second encoding process separates the processing signals into tonal components and non-tonal components for encoding the separated components.

12. The encoding method as claimed in claim 1 wherein the first encoding process and the second encoding process differ in allocated bit rates at the time of encoding.

13. The encoding method as claimed in claim 1 wherein said channel signals are audio signals.

14. An encoding apparatus comprising:
   means for generating mixing coefficients of a plurality of channel signals wherein said mixing coefficients are determined from inter-channel correlation coefficients;
   means for mixing said channel signals based on said mixing coefficients to form mixed channel signals;
   means for generating plural processing signals corresponding to said channel signals form the mixed channel signals;
   means for encoding a part of said processing signals utilizing a first encoding process; and
   means for encoding a remaining part of said processing signals utilizing a second encoding process;
   wherein said first encoding process differs from said second encoding process.

15. The encoding apparatus as claimed in claim 14 wherein said mixing coefficients are determined to values that result in inter-channel correlation that is higher after said mixing than that before said mixing.

16. The encoding apparatus as claimed in claim 14 wherein said inter-channel correlation coefficients are found from the covariance and standard deviation of the channel signals.

17. The encoding apparatus as claimed in claim 14 wherein said mixing coefficients are determined to values which become smaller as the inter-channel correlation coefficients become larger.

18. The encoding apparatus as claimed in claim 14 wherein said mixing coefficients are determined to values which become larger as the inter-channel correlation coefficients become smaller.

19. The encoding apparatus as claimed in claim 14 wherein said mixing coefficients comprise plural coefficients such that the sum of coefficients for multiplication of the respective channels is equal to 1.

20. The encoding apparatus as claimed in claim 14 wherein said second encoding process transforms time-domain processing signals into spectral signals in terms of a transform block of a pre-set length and encodes the resulting blocked spectral signals.

21. The encoding apparatus as claimed in claim 20 wherein said first encoding process transforms the time-domain processing signals every transform block of a pre-set length into spectral signals and encodes the resulting spectral signals and wherein the transform block length when transforming the time-domain processing signals in said second encoding process into the spectral signals is longer than the transform block length when transforming the processing signals into spectral signals.

22. The encoding apparatus as claimed in claim 20 wherein said second encoding process encodes spectral signals of a transform block across plural frames.

23. The encoding apparatus as claimed in claim 14 wherein said second encoding process encodes signal components of the processing signals by variable length encoding.

24. The encoding apparatus as claimed in claim 14 wherein said second encoding process separates the processing signals into tonal components and non-tonal components for encoding the separated components.

25. The encoding apparatus as claimed in claim 14 wherein said first encoding process and the second encoding process differ in allocated bit rates at the time of encoding.

26. If The encoding apparatus as claimed in claim 14 wherein said channel signals are audio signals.

27. A recording medium having recorded thereon encoded signals, wherein the recorded signals comprise codestrings generated by:
    generating mixing coefficients of a plurality of channel signals wherein said mixing coefficients are determined from inter-channel correlation coefficients;
    mixing said channel signals based on said mixing coefficients to form mixed channel signals;
    generating plural processing signals corresponding to said channel signals from the mixed channel signals;
    encoding a part of the processing signals utilizing a first encoding process; and
    encoding a remaining part of the processing signals utilizing a second encoding process; where said first encoding process differs from said second encoding process.

28. The recording medium as claimed in claim 27 wherein inter-channel correlation after said channel mixing is higher than that prior to said channel mixing.

29. The recording medium as claimed in claim 27 wherein said codestrings comprise a first codestring obtained by the first encoding process and a second codestring obtained by the second encoding process.

30. The recording medium as claimed in claim 29 wherein said second codestring is obtained by transforming time-domain processing signals in terms of a transform block of a pre-set length into spectral signals.

31. The recording medium as claimed in claim 30 wherein:
    said first codestring is obtained by transforming time-domain processing signals in terms of a transform block of a pre-set length into spectral signals and encoding the resulting spectral signals;
    the transform block of said second codestring is longer in length than that of the first codestring.

32. The recording medium as claimed in claim 29 wherein the spectral signals of a transform block of said second codestring lie across plural frames.

33. The recording medium as claimed in claim 29 wherein said second codestring is obtained by variable length coding of signal components of the processing signals.

34. The recording medium as claimed in claim 29 wherein said second codestring is obtained by separating said processing signals into tonal components and non-tonal components and encoding the resulting separated signals.

35. The recording medium as claimed in claim 29 wherein said first codestring has a bit rate different from that of the second codestring.

36. The recording medium as claimed in claim 27 wherein said channel signals are audio signals.

37. An encoding method comprising:
    generating mixing coefficients of a plurality of channel signals wherein said mixing coefficients are determined from inter-channel correlation coefficients found from covariance and standard deviation of the channel signals;
    mixing said channel signals based on said mixing coefficients to form mixed channel signals;
    generating a first processed signal and a second processed signal from the mixed channel signals;
    encoding the first processed signal utilizing a first encoding process; and
    encoding the second processed signal utilizing a second encoding process; where said first encoding process differs from said second encoding process.

38. A method according to claim 37, wherein the first processed signal is an (L+R)/2 signal.

39. A method according to claim 37, wherein the second processed signal is an (L−R)/2 signal.

40. An encoder comprising:
    means for generating mixing coefficients of a plurality of channel signals wherein said mixing coefficients are determined from inter-channel correlation coefficients found from covariance and standard deviation of the channel signals;
    means for mixing said channel signals based on said mixing coefficients to form mixed channel signals;
    means for generating a first processed signal and a second processed signal from the mixed channel signals;
    means for encoding the first processed signal and the second processed signal utilizing a first encoding process; and
    means for encoding the second processed signal utilizing a second encoding process; where said first encoding process differs from said second encoding process.

41. An encoder according to claim 40, wherein at least one of the first and second processed signals is an (L+R)/2 signal or an (L−R)/2 signal.

42. An encoding method comprising:
    generating mixing coefficients of a plurality of channel signals wherein said mixing coefficients are determined from inter-channel correlation coefficients;
    generating plural processing signals corresponding to said channel signals from said channel signals;
    multiplying said processing signals with coefficients derived from said mixing coefficients;

encoding a part of the processing signals multiplied with said coefficients utilizing a first encoding process; and encoding a remaining part of the processing signals multiplied with said coefficients utilizing a second encoding process;

wherein said first encoding process differs from said second encoding process.

43. An encoding apparatus comprising:

means for generating mixing coefficients of a plurality of channel signals wherein said mixing coefficients are determined from inter-channel correlation coefficients;

means for generating plural processing signals corresponding to said channel signals from said channel signals;

means ,for multiplying said processing signals with coefficients derived from said mixing coefficients;

means for encoding a part of the processing signals multiplied with said coefficients utilizing a first encoding process; and means for encoding a remaining part of the processing signals multiplied with said coefficients utilizing a second encoding process;

wherein said first encoding process differs from said second encoding process.

44. A recording medium having recorded thereon encoded signals, wherein the recorded signals comprise codestrings generated by:

generating mixing coefficients of a plurality of channel signals wherein said mixing coefficients are determined from inter-channel correlation coefficients;

generating plural processing signals corresponding to said channel signals from said channel signals;

multiplying said processing signals with coefficients derived from said mixing coefficients;

encoding a part of the processing signals multiplied with said coefficients utilizing a first encoding process; and encoding a remaining part of the processing signals multiplied with said coefficients utilizing a second encoding process;

wherein said first encoding process differs from said second encoding process.

* * * * *